US010748342B2

(12) United States Patent
Joyce et al.

(10) Patent No.: US 10,748,342 B2
(45) Date of Patent: Aug. 18, 2020

(54) INTERACTION SYSTEM FOR AUGMENTED REALITY OBJECTS

(71) Applicant: GOOGLE LLC, Mountain View, CA (US)

(72) Inventors: Alan Joyce, Mountain View, CA (US); Douglas Muir, Encino, CA (US); Mark Dochtermann, Sherman Oaks, CA (US); Bryan Woods, Santa Clara, CA (US); Tarik Abdel-Gawad, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 73 days.

(21) Appl. No.: 16/012,072

(22) Filed: Jun. 19, 2018

(65) Prior Publication Data

US 2019/0385371 A1 Dec. 19, 2019

(51) Int. Cl.
*G06T 19/00* (2011.01)
*G06T 7/70* (2017.01)
*G02B 27/01* (2006.01)
*G06F 3/0481* (2013.01)
*G06F 3/0484* (2013.01)
*G06T 7/20* (2017.01)

(52) U.S. Cl.
CPC ........ *G06T 19/006* (2013.01); *G02B 27/0172* (2013.01); *G06F 3/04815* (2013.01); *G06F 3/04842* (2013.01); *G06T 7/20* (2013.01); *G06T 7/70* (2017.01); *G02B 2027/0138* (2013.01)

(58) Field of Classification Search
None
See application file for complete search history.

(56) References Cited

U.S. PATENT DOCUMENTS

| 6,526,395 | B1 | 2/2003 | Morris |
| 9,811,937 | B2 | 11/2017 | O'Sullivan et al. |
| 2002/0171647 | A1 | 11/2002 | Sterchi et al. |
| 2011/0242134 | A1* | 10/2011 | Miller .................. G06T 19/006 345/633 |

(Continued)

OTHER PUBLICATIONS

Newton, "Snapchat's Bitmoji avatars are now threedimensional and animated", The Verge, Sep. 14, 2017, 3 pages.

(Continued)

*Primary Examiner* — Vu Nguyen
(74) *Attorney, Agent, or Firm* — Brake Hughes Bellermann LLP

(57) ABSTRACT

In a system and method providing for interaction with virtual objects, and interaction between virtual objects, in an augmented reality, or mixed reality, or virtual reality, environment, detected conditions may trigger animated responses from virtual objects placed in a view of a physical environment. The detected conditions may include the detection of a user within a set threshold distance or proximity, the detection of another virtual object within a set threshold placement distance or proximity, the detection of particular environmental conditions in the view of the physical environment, and other such factors. Specific behavioral animations of the virtual objects may be triggered in response to detection of specific virtual objects and/or other conditions.

12 Claims, 21 Drawing Sheets

(56) References Cited

U.S. PATENT DOCUMENTS

| | | | |
|---|---|---|---|
| 2013/0307875 A1* | 11/2013 | Anderson | G06T 19/006 345/633 |
| 2016/0110922 A1 | 4/2016 | Haring | |
| 2017/0132828 A1 | 5/2017 | Zelenin et al. | |
| 2017/0213473 A1 | 7/2017 | Ribeira et al. | |
| 2017/0330362 A1 | 11/2017 | Sumner et al. | |
| 2017/0361230 A1* | 12/2017 | Tang | A63F 13/56 |
| 2019/0140885 A1* | 5/2019 | Murrish | A63F 13/847 |

OTHER PUBLICATIONS

International Search Report and Written Opinion for International Application No. PCT/US2019/015646, dated May 31, 2019, 26 pages.

\* cited by examiner

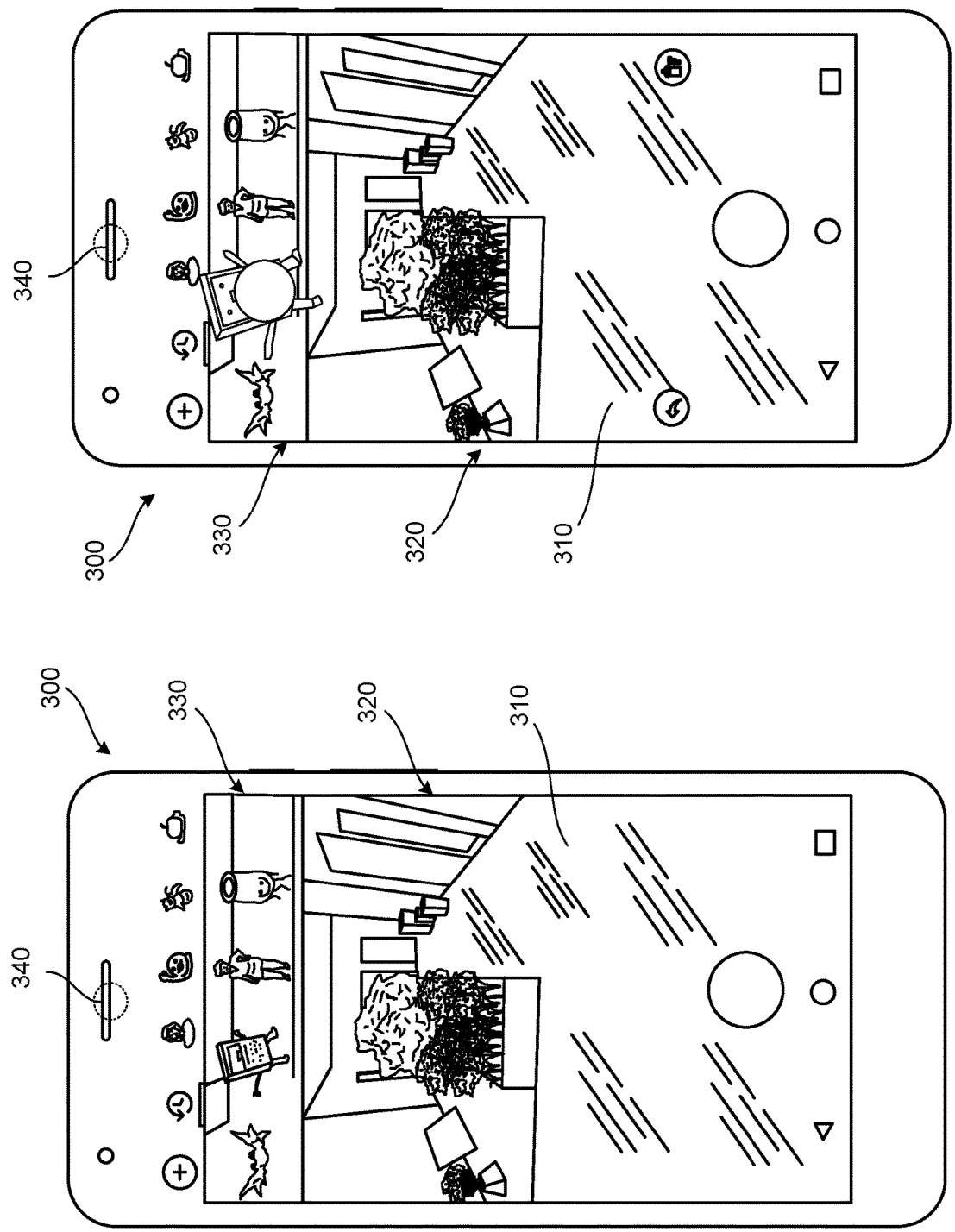

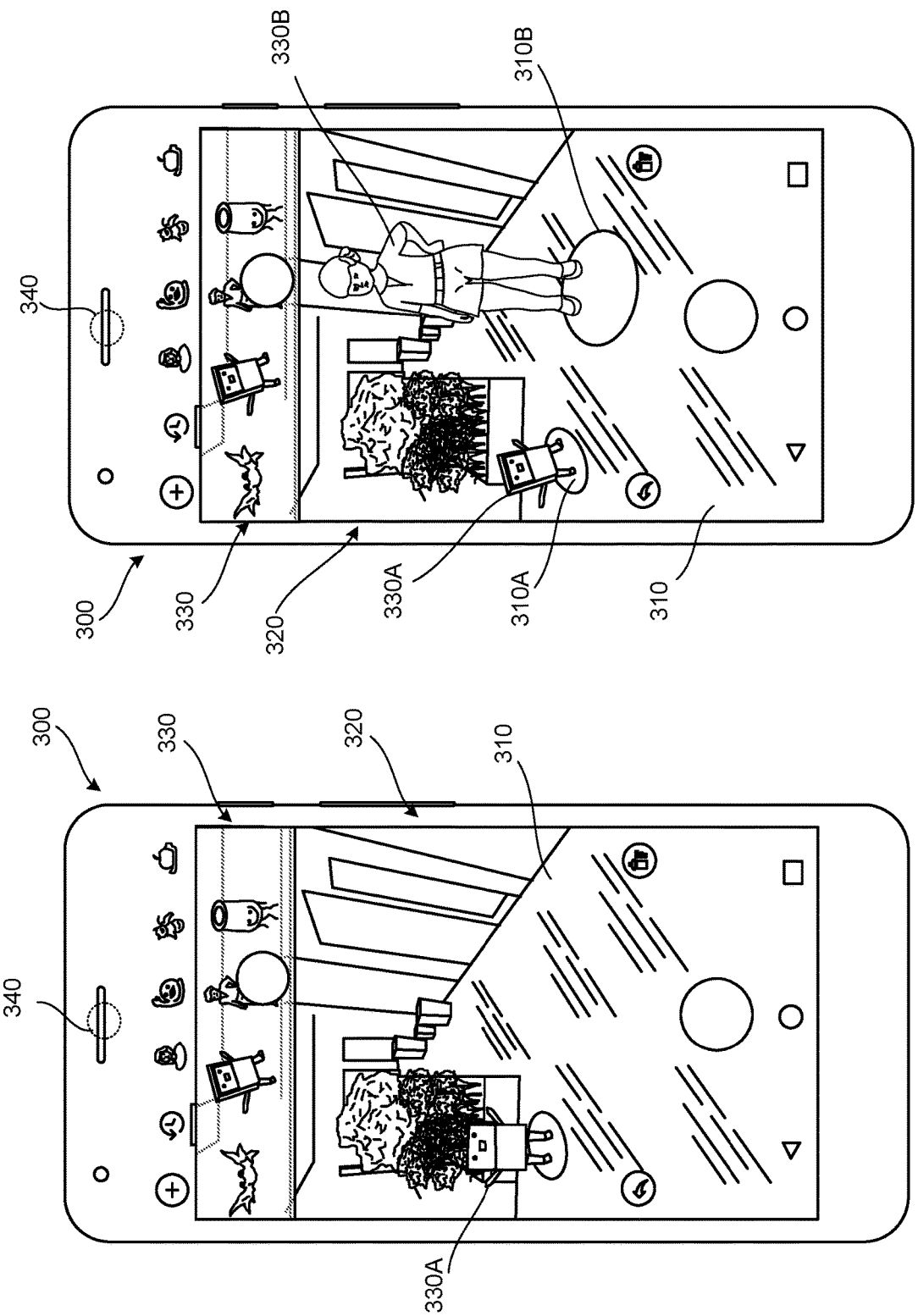

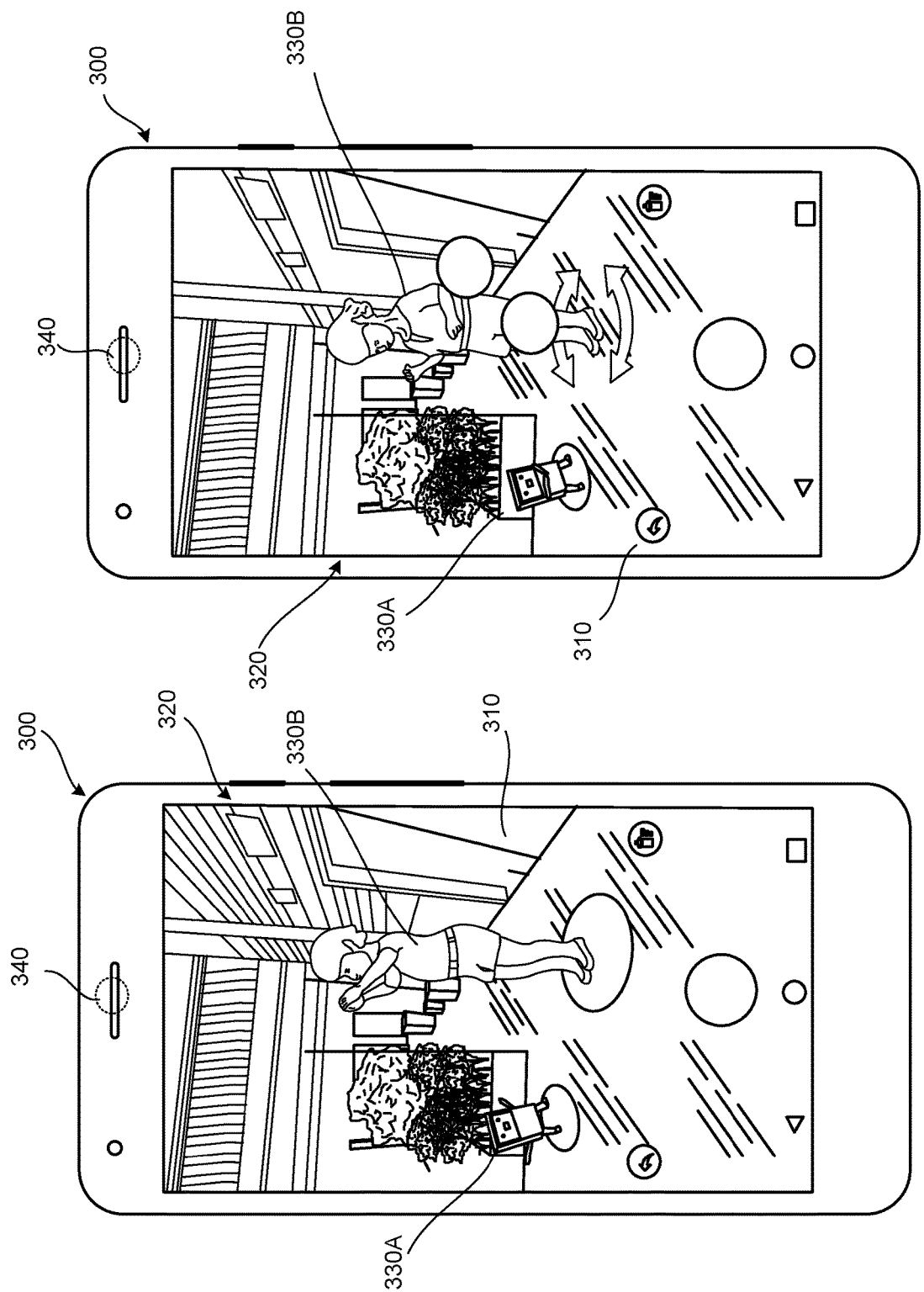

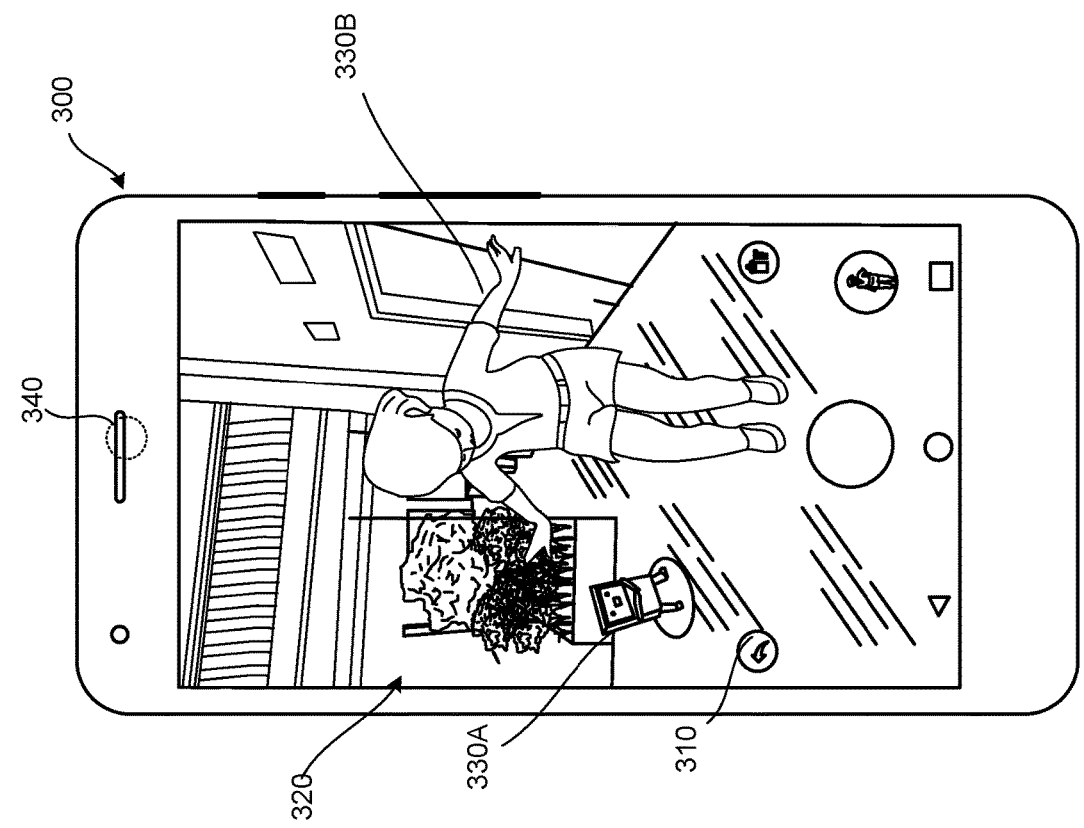
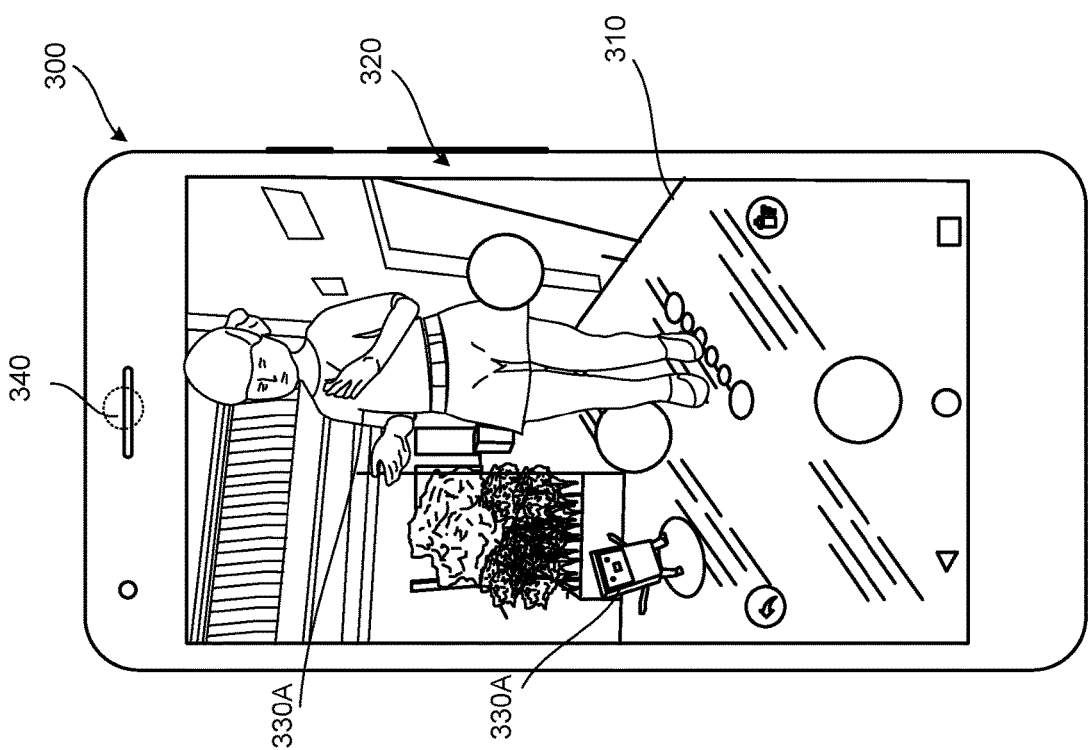

INTERACTION SYSTEM FOR AUGMENTED REALITY OBJECTS

TECHNICAL FIELD

This description generally relates to the use of computing devices in an augmented reality (AR) environment and/or a virtual reality (VR) environment.

BACKGROUND

Augmented reality systems, or mixed reality systems, or virtual reality systems, may allow users to view scenes, for example, scenes corresponding to their physical environment, and to augment the scenes of their physical environment with virtual objects, or virtual characters. An augmented reality (AR) system and/or a virtual reality (VR) system may generate a three-dimensional (3D) immersive augmented and/or virtual reality environment. A user may experience this augmented reality, or mixed reality, or virtual reality, environment through interaction with various electronic devices. A user may move through and interact with elements in is augmented reality, or mixed reality, or virtual reality, environment through, for example, gestures, manipulation of the electronic device and/or external devices operably coupled to the electronic device. A user experience in this type of augmented reality, or mixed reality, or virtual reality, experience, would be enhanced by germane, pertinent, contextual interaction with the virtual object(s) and/or character(s) placed in the view of scene of the physical environment. Such interaction would enhance the realistic nature of the user's augmented reality, or mixed reality experience, and enhance user presence in the augmented reality, or mixed reality experience.

SUMMARY

In one general aspect, a computer-implemented method may include displaying, by an electronic device, a mixed reality scene, detecting a selection of a first virtual object for placement in the mixed reality scene, displaying the selected first virtual object at a placement position in the mixed reality scene in response to the detected selection, detecting an animation trigger, of a plurality of animation triggers, identifying an animation, from a plurality of animations, for the first virtual object based on the detected animation trigger, and executing the identified animation of the first virtual object in response to the detected animation trigger.

In another general aspect, a system may include a computing device configured to generate a mixed reality environment. The computing device may include a memory storing executable instructions, and a processor configured to execute the instructions. Execution of the instructions may cause the computing device to display a mixed reality scene, detect a selection of a first virtual object for placement in the mixed reality scene, display the selected first virtual object at a placement position in the mixed reality scene in response to the detected selection, detect an animation trigger, of a plurality of animation triggers, identify an animation, from a plurality of animations, for the first virtual object based on the detected animation trigger, and execute the identified animation of the first virtual object in response to the detected animation trigger.

The details of one or more implementations are set forth in the accompanying drawings and the description below. Other features will be apparent from the description and drawings, and from the claims.

BRIEF DESCRIPTION OF THE DRAWINGS

FIGS. 4A-4J illustrate animation and interaction of virtual objects in an augmented reality, or mixed reality, environment, in accordance with implementations described herein.

DETAILED DESCRIPTION

An augmented reality (AR) system, or a mixed reality system, may allow users to place three-dimensional (3D) virtual objects, or augmented reality objects, or mixed reality objects, in a physical environment, and to view the 3D virtual objects/augmented reality objects/mixed reality objects, for example, within a camera view, on a display portion of a head mounted display device, and the like. In some implementations, the 3D virtual/augmented reality/mixed reality objects may interact with users, and with each other, in a relatively realistic manner, to make the 3D virtual/augmented reality/mixed reality objects feel as though they are physically present in the physical environment of the user, rather than simply virtually present. In some implementations, the interaction of the 3D virtual/augmented reality/mixed reality objects with the user, and with each other, may be contextual, or context appropriate, or consistent, interactive, and reactive to the surrounding environment and changes in the surrounding environment, so as to further enhance the realistic nature of the 3D virtual/augmented reality/mixed reality object placement in the physical environment. Hereinafter, simply for ease of explanation, implementations to be described herein will be referred to as mixed reality systems allowing users to place 3D virtual objects in the physical environment to create a mixed reality environment, or mixed reality experience.

Figure 1C:
FIGS. 1A-1C illustrate exemplary systems for generating an augmented reality, or mixed reality, environment.
Figure 1B:
Figure 1A:
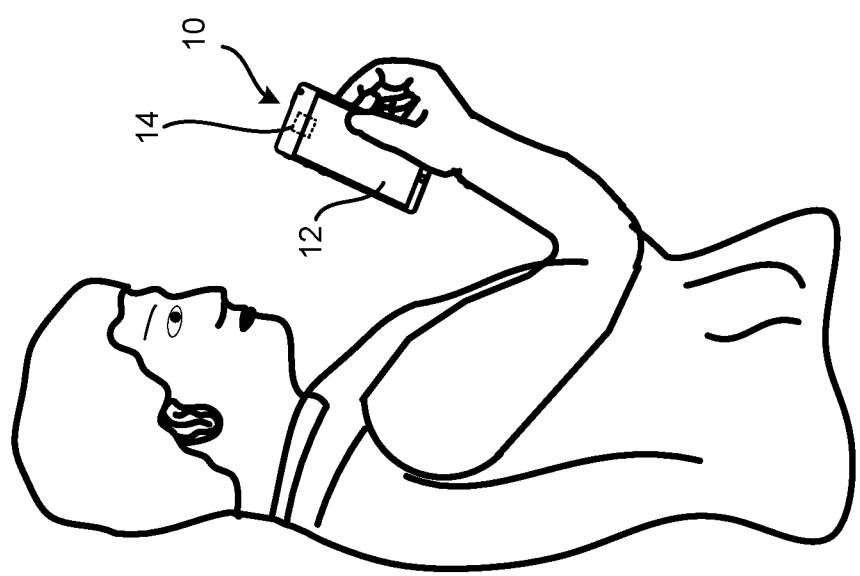

FIGS. 1A-1C illustrate a user with one or more electronic devices that can generate an augmented reality, or mixed reality, or virtual environment. As illustrated in the example shown in FIG. 1A, in some implementations, the user may view and experience a mixed reality environment on a display portion 12 of a handheld device 10 that displays a camera view of the physical environment, captured by an imaging device 14 of the handheld device 10, together with virtual objects placed by the user in the camera view of the physical environment displayed on the display portion 12. As illustrated in the example shown in FIG. 1B, in some implementations, the user may view and experience the mixed reality environment via a display portion of a head mounted device 16. In this arrangement, the physical environment may be visible to the user through the head mounted device 16, and the virtual objects may be placed by the user and visible on a display portion of the head mounted device 16, superimposed on the user's view of the physical environment. As illustrated in the example shown in FIG. 1C, in some implementations, the user may view and experience the mixed reality environment via a display portion of a head mounted device 18 which occludes the user's direct visibility of the physical environment. In this arrangement, a pass through image of the physical environment may displayed on a display portion of the head mounted device 18, with virtual objects placed by the user superimposed on the pass through image of the physical environment. Each of the handheld device 10 and the head mounted devices 16 and 18 illustrated in FIGS. 1A-1C are electronic devices including display devices capable of displaying virtual reality objects in an augmented reality, or mixed reality environment. Hereinafter, simply for ease of discussion and illustration, examples of a system providing for interaction of objects in a mixed reality environment, in accordance with implementations described herein, will be presented based on a camera view displayed on a display device of an electronic device similar to what is illustrated in FIG. 1A. However, the principles to be described herein may be applied to other electronic device(s) and/or systems capable of generating and presenting a mixed reality environment in which users may place 3D virtual objects, for interaction with the virtual objects, and/or for interaction amongst the virtual objects.

Figure 2A:
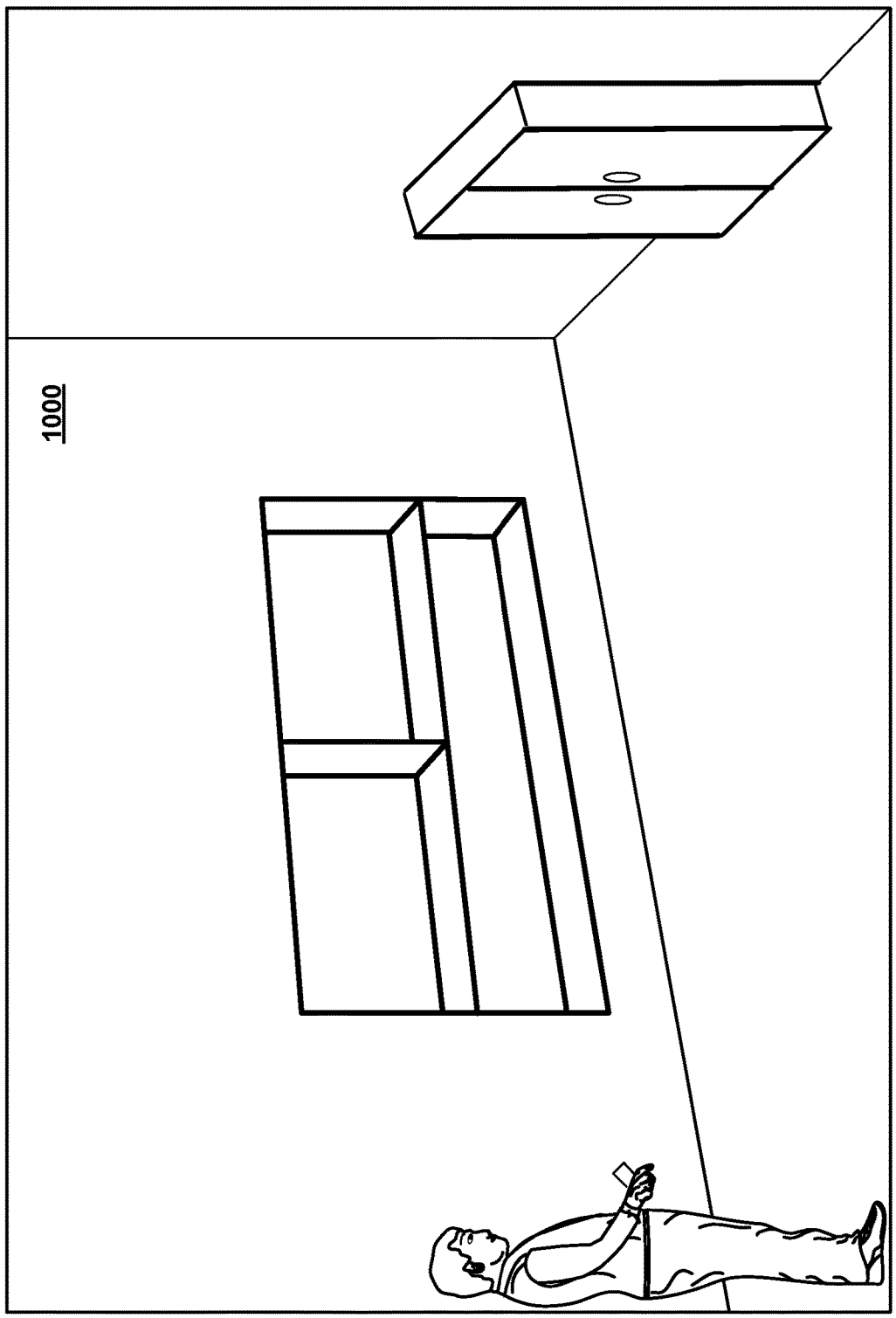
FIGS. 2A-2H illustrate animation and interaction of virtual objects in an augmented reality, or mixed reality, environment, in accordance with implementations described herein.
Figure 2B:
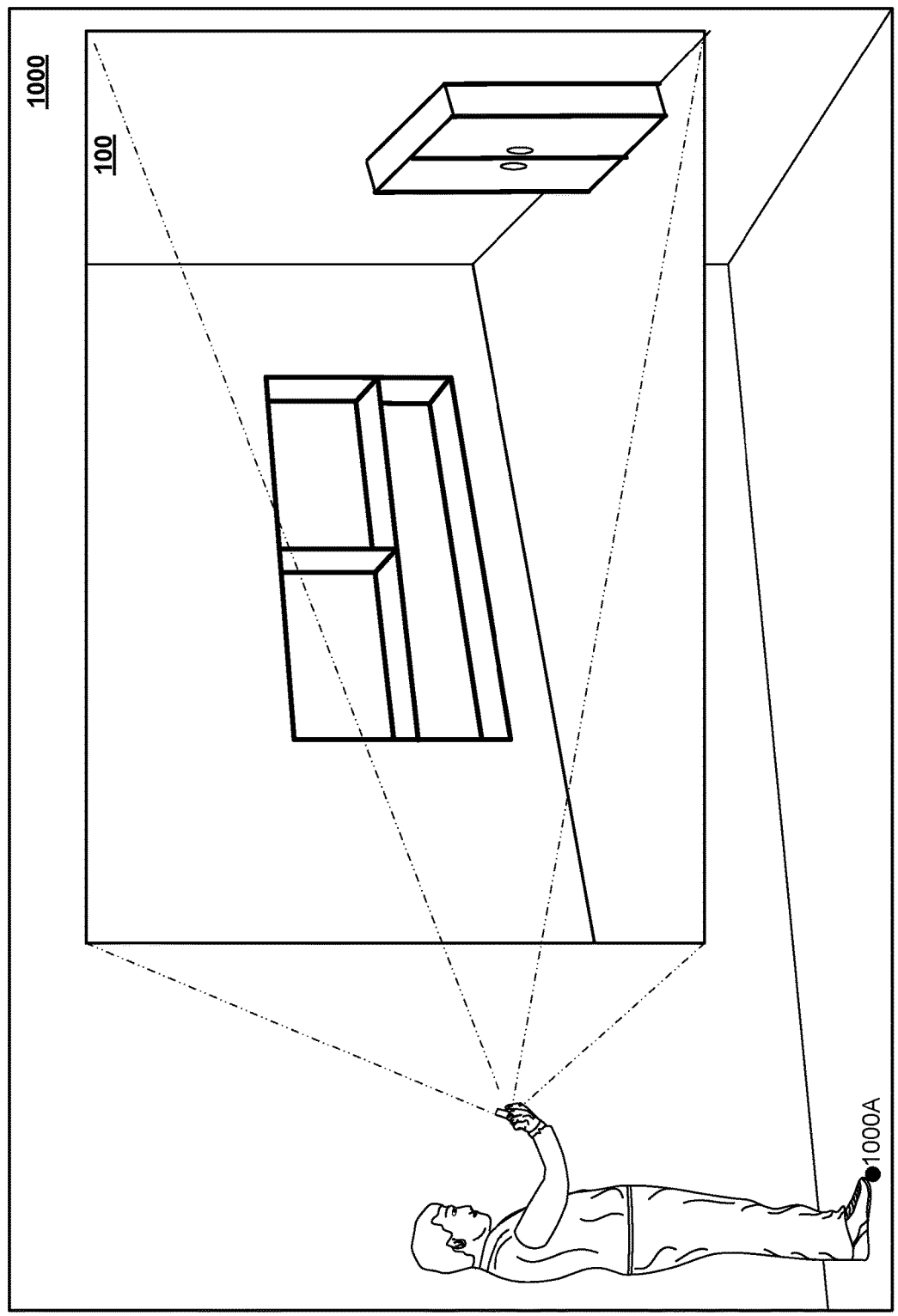

FIGS. 2A and 2B are third person views of a user in a physical environment 1000. In FIGS. 2A and 2B, the user is at a position 1000A in the physical environment 1000. The position 1000A of the user in the physical environment 1000 may correspond to a position of an imaging device, or a camera, of an electronic device held by the user in this example. A mixed reality scene 100 (for example, corresponding to a camera view of the physical environment 1000) may captured by the imaging device of the electronic device. The mixed reality scene 100 may be displayed on, for example, a display device of the electronic device, for viewing by the user. In FIG. 2B, the mixed reality scene 100 of the physical environment 1000 is illustrated in an enlarged state, separated from the electronic device, simply for ease of discussion and illustration. The mixed reality 100 visible to the user via the electronic device may represent a portion of the physical environment 1000 that is captured within a field of view of the imaging device of the electronic device.

Figure 2C:
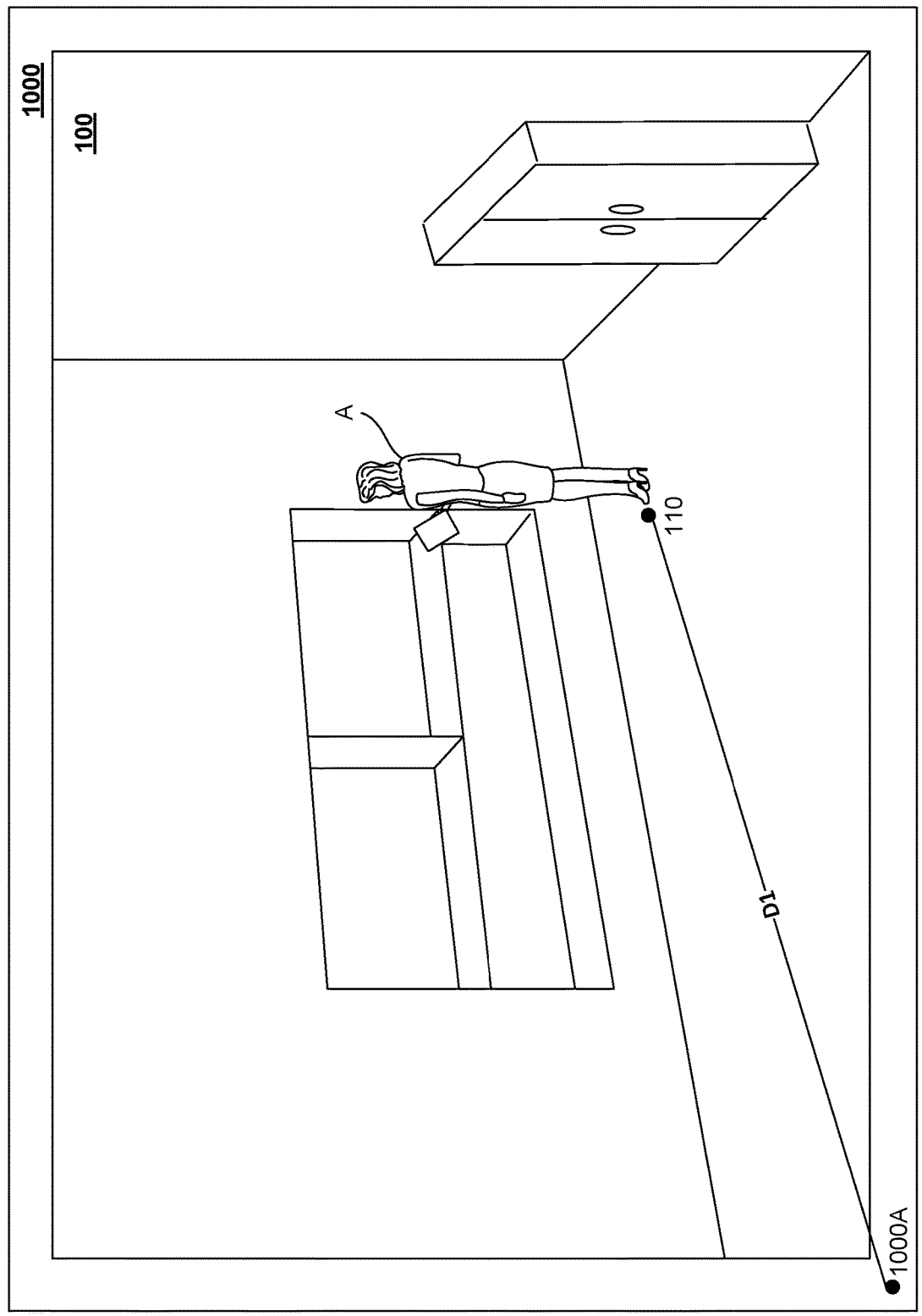

The user may place a first virtual object A in the mixed reality scene 100, as shown in FIG. 2C. In the example shown in FIG. 2C, the first virtual object A is a first virtual character A is positioned on the ground, at a position 110 corresponding to what would be a first distance D1 from the user at the position 1000A. In this example, the distance D1 may represent a distance between the user at the position 1000A and the placement position 110 of the first character A at the time of placement of the first character A by the user. In some situations, the user may move within the physical environment 1000. As the user approaches the placement position 110 of the character A, decreasing the distance between the user and the placement position 110 of the character A, the system may detect that the user is nearing the character A. For example, the system may detect that the user is within a threshold distance D2 of the placement position 110 of the character A. In other words, the system may detect that a distance between the user and the placement position 110 of the character A is less than or equal to the threshold distance D2.

Figure 2D:
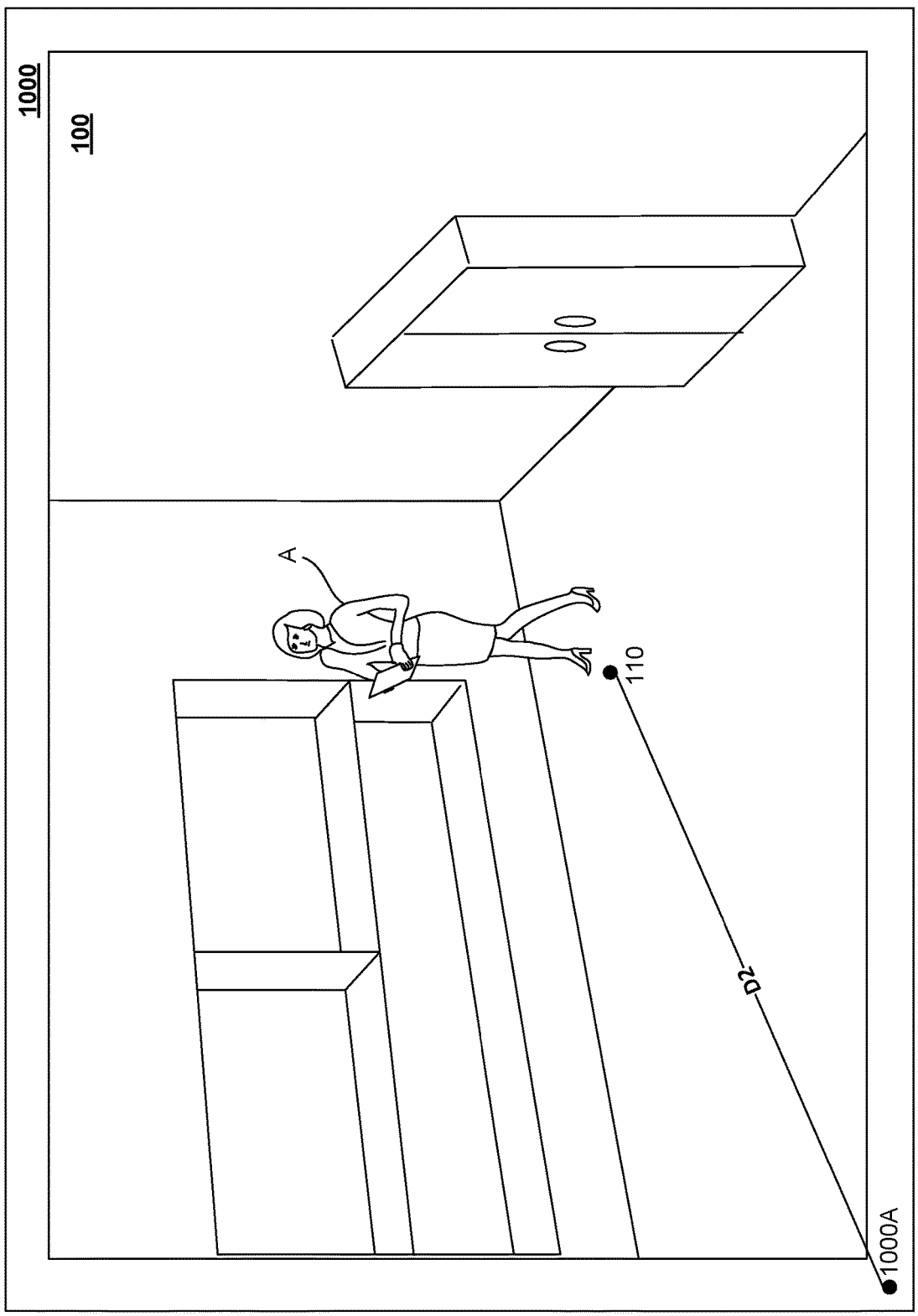

The system may treat the detection of the user within the threshold distance of the character A as an animation trigger. In response to detection of the user within the threshold distance D2 of the placement position 110 of the character A (i.e., in response to the detected animation trigger), the system may cause the character A to react to the approach of the user in an appropriate, or natural, or expected manner. For example, in some implementations, in response to the detection of the user within the threshold distance D2 of the placement position 110 of the character A (i.e., in response to the detected animation trigger), the system may animate the character A by, for example, causing the character A to react by turning to face the user, as shown in FIG. 2D.

Figure 2E:
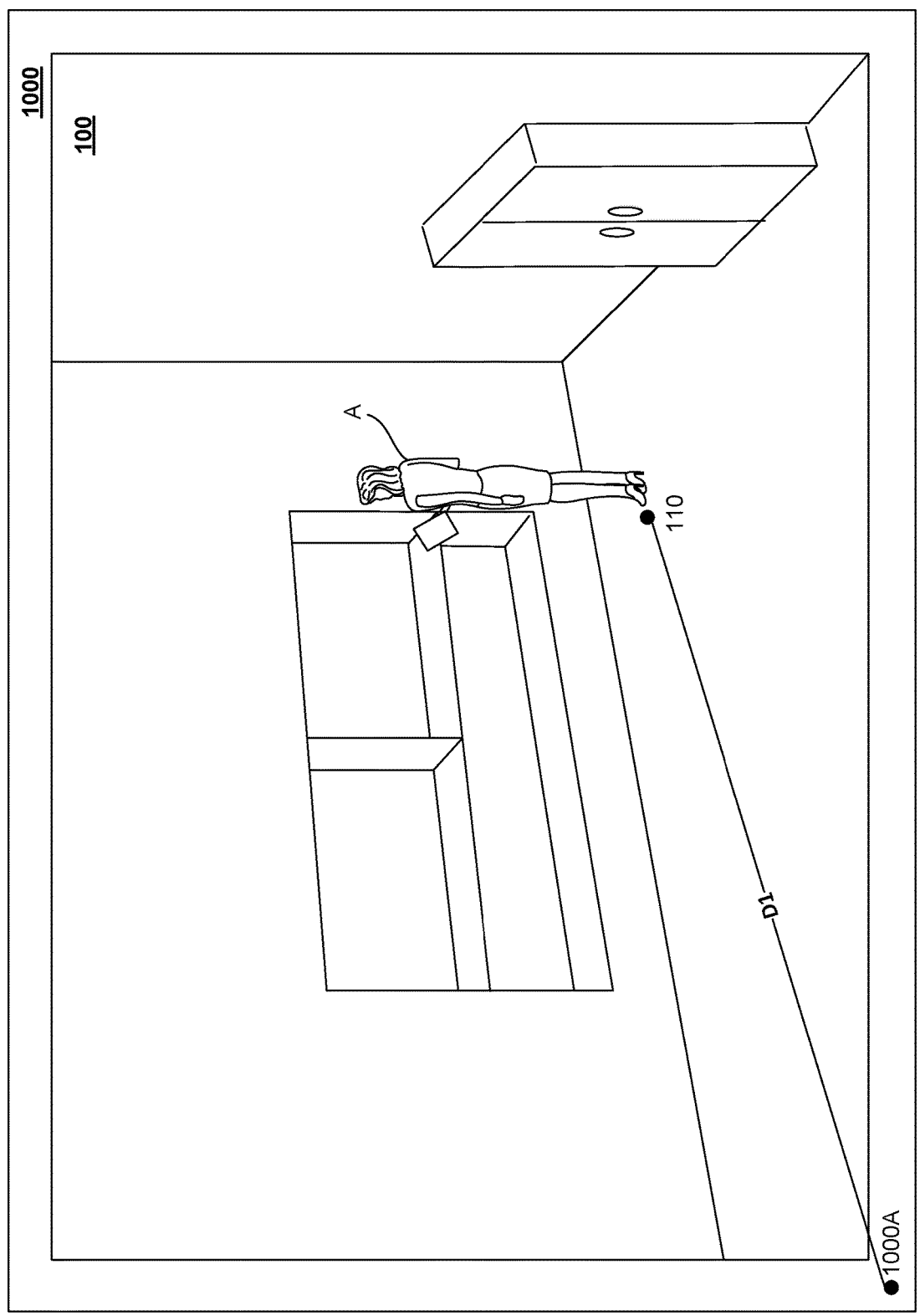
Figure 2F:
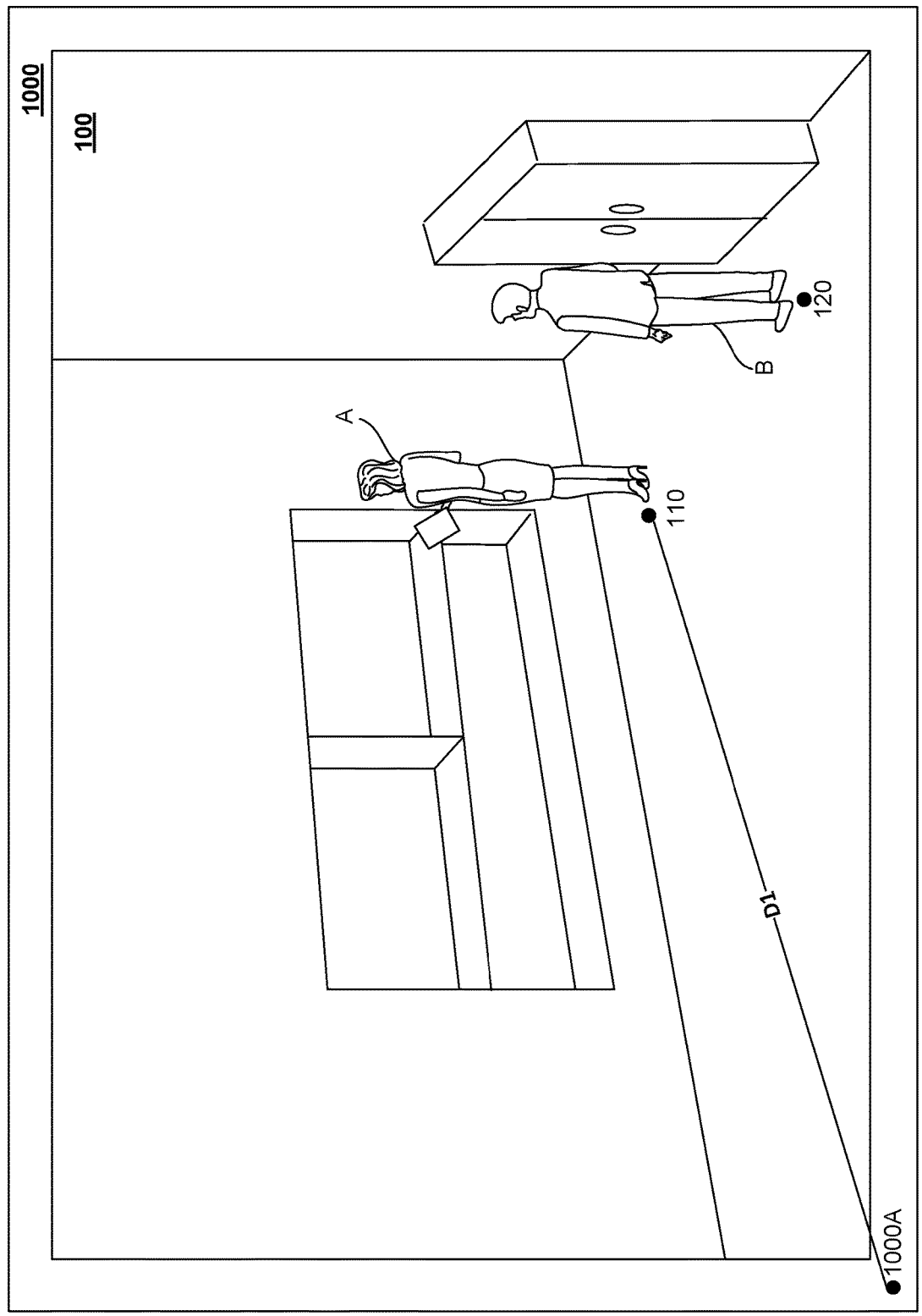
Figure 2G:
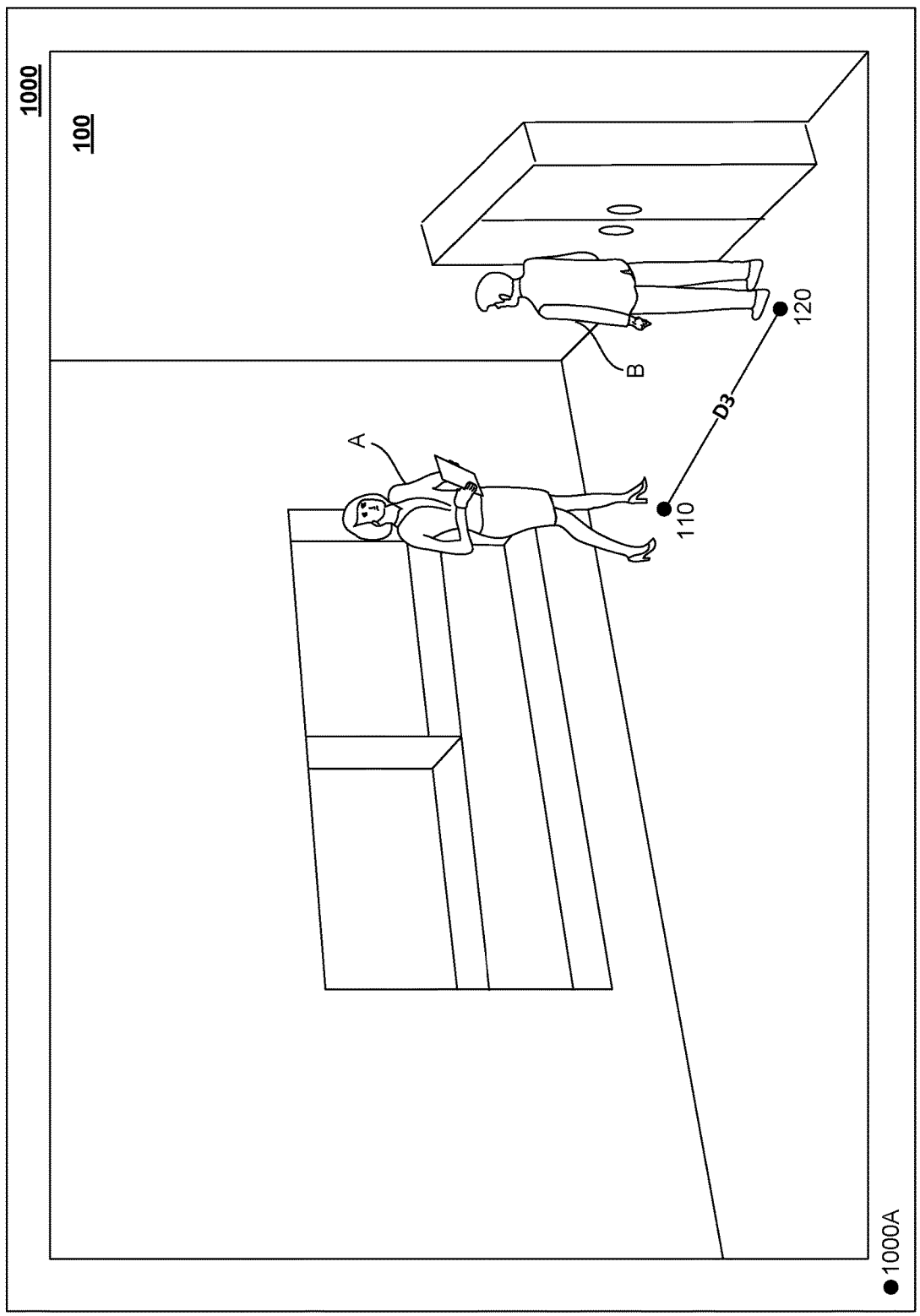
Figure 2H:
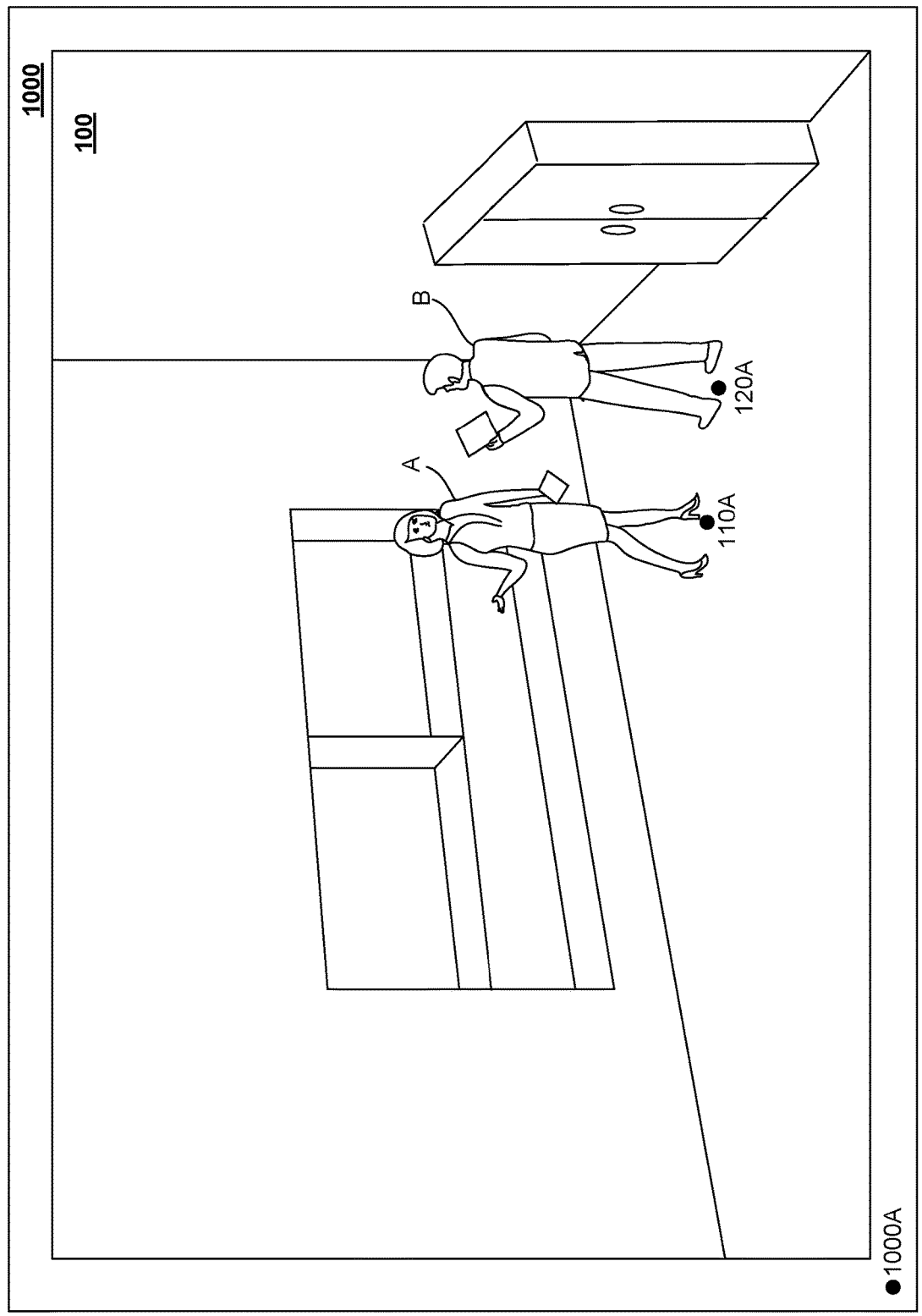

Similarly, in some implementations, the user may place the first virtual character A at the first placement position 110, as shown in FIG. 2E and as described above, and then place a second virtual object B, in the form of, for example, a second virtual character B, at a second placement position 120, for example, near the first virtual character A, as shown in FIG. 2F. The system may detect the placement of the second character B within a threshold placement distance D3 of the first character A. The system may treat the detection of the first character A and the second character B within the threshold placement distance D3 of each other as an animation trigger, and may animate the first character A and/or the second character B, or cause the first character A and/or the second character B to react in an appropriate manner. That is, detection of animation trigger in which the first and second characters A and B are within the threshold distance D3 of each other may cause the system to execute an animation of at least one of the first character A or the second character B. For example, in response to detection of the second character B within the threshold placement distance D3 of the first character A, the system may cause the first character A to turn towards the second character B, as shown in FIG. 2G, and/or may cause the first character A and the second character B to turn to face each other. In some implementations, animation of the first character A and/or the second character B may continue beyond this type of recognition of the second character B within a threshold distance of the first character A. For example, the first character A and the second character B may continue to interact in an appropriate, or natural, or expected manner by, for example, conversing, moving to new positions 110A, 120A, and the like, as shown in FIG. 2H. In some implementations, in response to the detected animation trigger/detection of the user within a set threshold distance of the position 110 of the first character A and/or within a set threshold distance of the position 120 of the second character B, the system may cause first character A and/or the second character B to react in an appropriate manner to the detection of the user within the threshold distance, as described above.

Each of the sequential illustrations of the mixed reality scenes 100 (in some implementations, corresponding to camera views 100 captured by an imaging device of the electronic device) shown in FIGS. 2A-2H is a still image, representing a snapshot at a point in a particular animation and/or interaction of the first and second virtual characters A and B. However, it may be understood that the animation, or interaction, displayed by the first and second virtual characters A and B in the mixed reality scene 100 may be a substantially continuous dynamic animation of 3D virtual object(s), or an intermittent dynamic animation of 3D virtual object(s), providing a relatively realistic representation of the movement of the virtual character.

The position of the electronic device (and of the imaging device, or camera, of the electronic device) in the physical environment may be known and tracked by the system. The known/tracked position of the electronic device/camera in the physical environment may, essentially, correspond to the position of the user in the physical environment. The placement position(s) of the virtual object(s) (the virtual characters A and B in the example described above with respect to FIGS. 2A-2H) may also be known by the system. In this example, the placement position of the virtual object may be a placement position in the mixed reality scene (in some implementations, corresponding to a camera view of the physical environment) that corresponds to a physical position in the physical environment. This correspondence between the placement position of each virtual object in the mixed reality scene and a physical position in the physical environment may allow the system to detect a distance between and/or positioning and/or orientation of the electronic device (i.e., the user) relative to the virtual object(s) placed in the mixed reality scene including the physical environment. This correspondence between the placement position of each virtual object and a physical position in the physical environment may also allow the system to detect a distance between and/or relative positioning and/or relative orientation of different virtual objects placed in the mixed reality scene including the physical environment.

In some implementations, this detection and/or tracking of the positions of each of the virtual objects in the mixed reality scene of the physical environment, and detection and/or tracking of the position of the electronic device/user, may be based on respective individual three-dimensional coordinate positions of the virtual object(s) and the electronic device/user. For example, each virtual object in the mixed reality scene of the physical environment may have an associated three-dimensional coordinate position, for example, an associated (x,y,z) coordinate position. The (x,y,z) coordinate position of each virtual object in the mixed reality scene may correspond to a physical, three-dimensional (x,y,z) coordinate position in the physical environment. Similarly, the electronic device/user may have an associated three-dimensional (x,y,z) coordinate position in the physical environment. The respective three-dimensional (x,y,z) coordinate positions of the virtual object(s) and of the electronic device/user may be intermittently updated, or substantially continuously updated, as the mixed reality scene is updated to reflect movement of the electronic device/user, movement/animation of the virtual object(s), and the like. As the detected three-dimensional (x,y,z) coordinate position(s) of the virtual object(s) and the detected three-dimensional (x,y,z) coordinate position of the electronic device/user are updated, the respective detected three-dimensional (x,y,z) coordinate positions may be used to calculate distances, and update calculated distances, between the electronic device/user and the virtual object(s) and/or between the virtual objects. The system may use distances calculated in this manner to determine when the electronic device/user has moved to a position that is within the set threshold distance of a virtual object or has moved outside of the set threshold distance of the virtual object, when a second virtual object is within the set threshold placement distance of a first virtual object or has moved outside of the set threshold placement distance of the second virtual object, and the like.

In placing virtual object(s), such as, for example, virtual character(s), in the mixed reality scene including the physical environment as described above (in particular, in the camera view of the physical environment, as described above), interaction with the user and/or interaction with each other may make the virtual object(s) feel more present, and more realistic. The virtual object(s) may follow an event-based interaction system, including a set of animations, triggers and effects determined based on, for example, a set of previously defined situational rules. In some implementations, a set of properties may be associated with each virtual object that is placed in the mixed reality scene. Detected animation triggers/triggering conditions may cause the system to execute selected, or identified, animations, based on the type of triggering condition(s) encountered In some implementations, the set of properties may include, for example, a set of animation properties. The set of animation properties may include, for example, a plurality of different animations a particular object may support, or may be able to perform, in response to detected animation triggers, conditions, inputs and the like. In some implementations, a plurality of different animations may be associated with each virtual object placed in the physical environment. The system may select, or identify, one of the animations, from the plurality of animations, based on the detected animation triggers, or triggering conditions, for execution by the virtual object in a particular situation or environment.

Figure 3A:
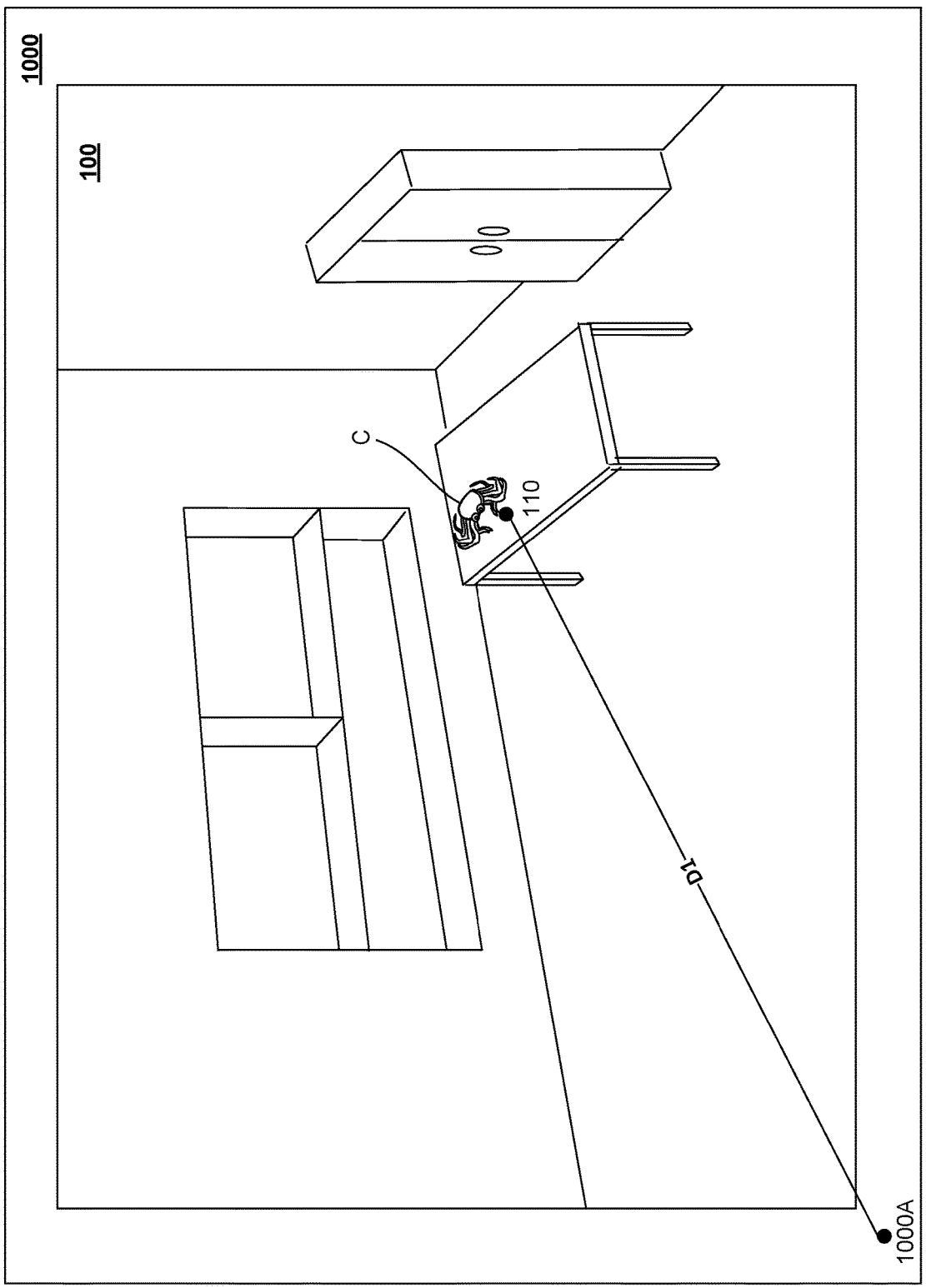
FIGS. 3A-3D illustrate animation and interaction of virtual objects in an augmented reality, or mixed reality, environment, in accordance with implementations described herein.

For example, a placement animation, may be executed by the virtual object upon placement in the mixed reality scene including the physical environment, to exhibit a sense of arrival at the placement position in the mixed reality scene. In the example illustrated in FIG. 3A, a virtual object C is placed on a real table represented in a mixed reality scene 100 (or, camera view 100) including the physical environment 1000. Upon placement of the virtual object C on the table, the virtual object C may, for example, open it eyes, glance around to provide an effect of familiarizing itself with its surroundings, and the like.

Figure 3B:
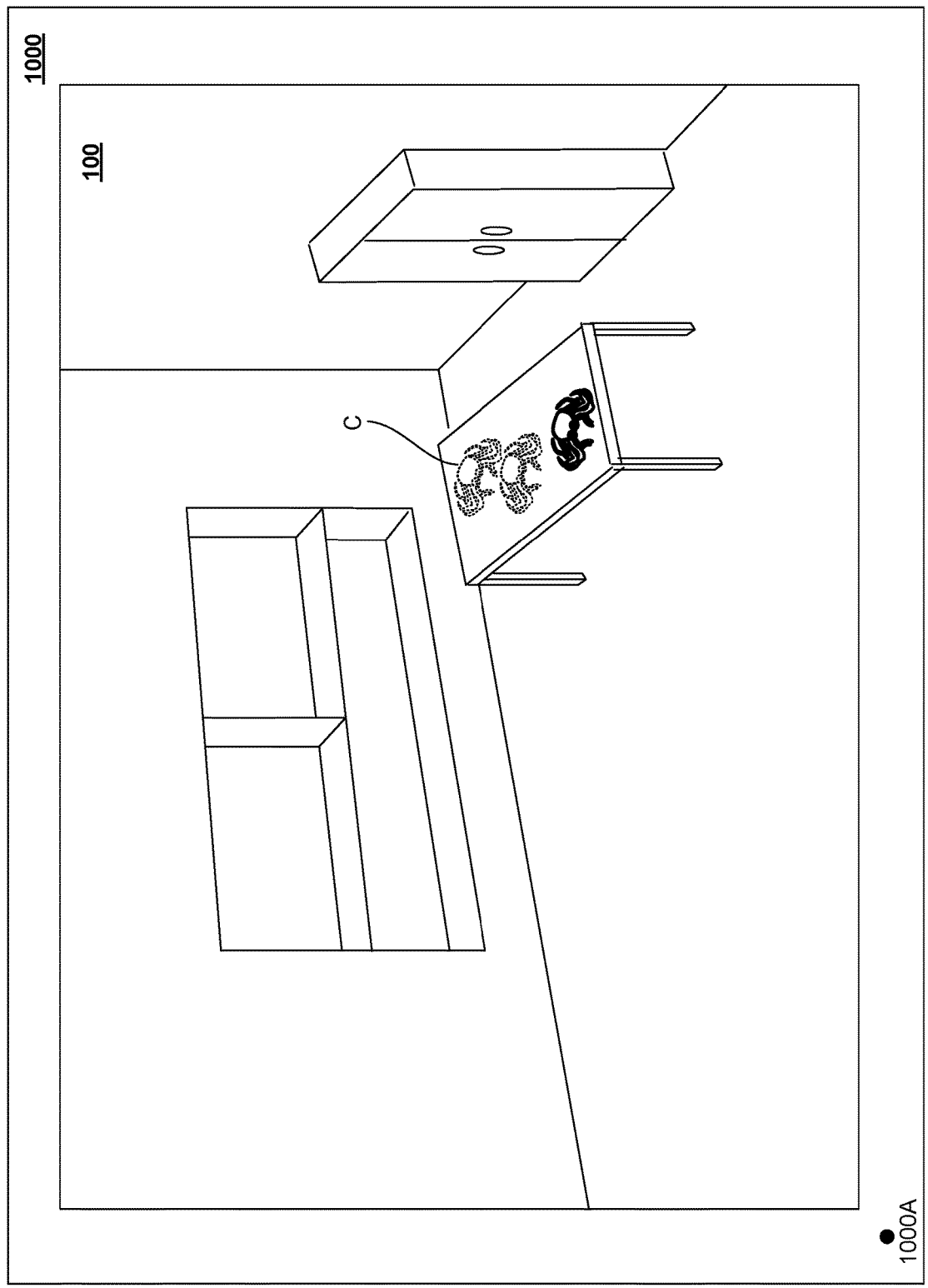

An idle animation may be executed by the virtual object while the virtual object is displayed in the mixed reality scene, but without any inputs, conditions and the like which would trigger a specific reaction or behavior (such as, for example, the detected approach of the user). In the example illustrated in FIG. 3B, in absence of detection of, for example, the presence of the electronic device/camera/user and/or another virtual object and/or other condition which would trigger a specific response from the virtual object C, the virtual object C moves back and forth along the surface of the table, consistent with idle behavior characteristics of this particular virtual object C (i.e., idle behavior that may be expected from a crab placed on a tabletop). The execution of this idle animation of the virtual object C in the absence of a specific condition triggering a specific interaction may provide a more realistic effect, causing the virtual object C to appear to be more present in the physical environment 1000.

Figure 3C:
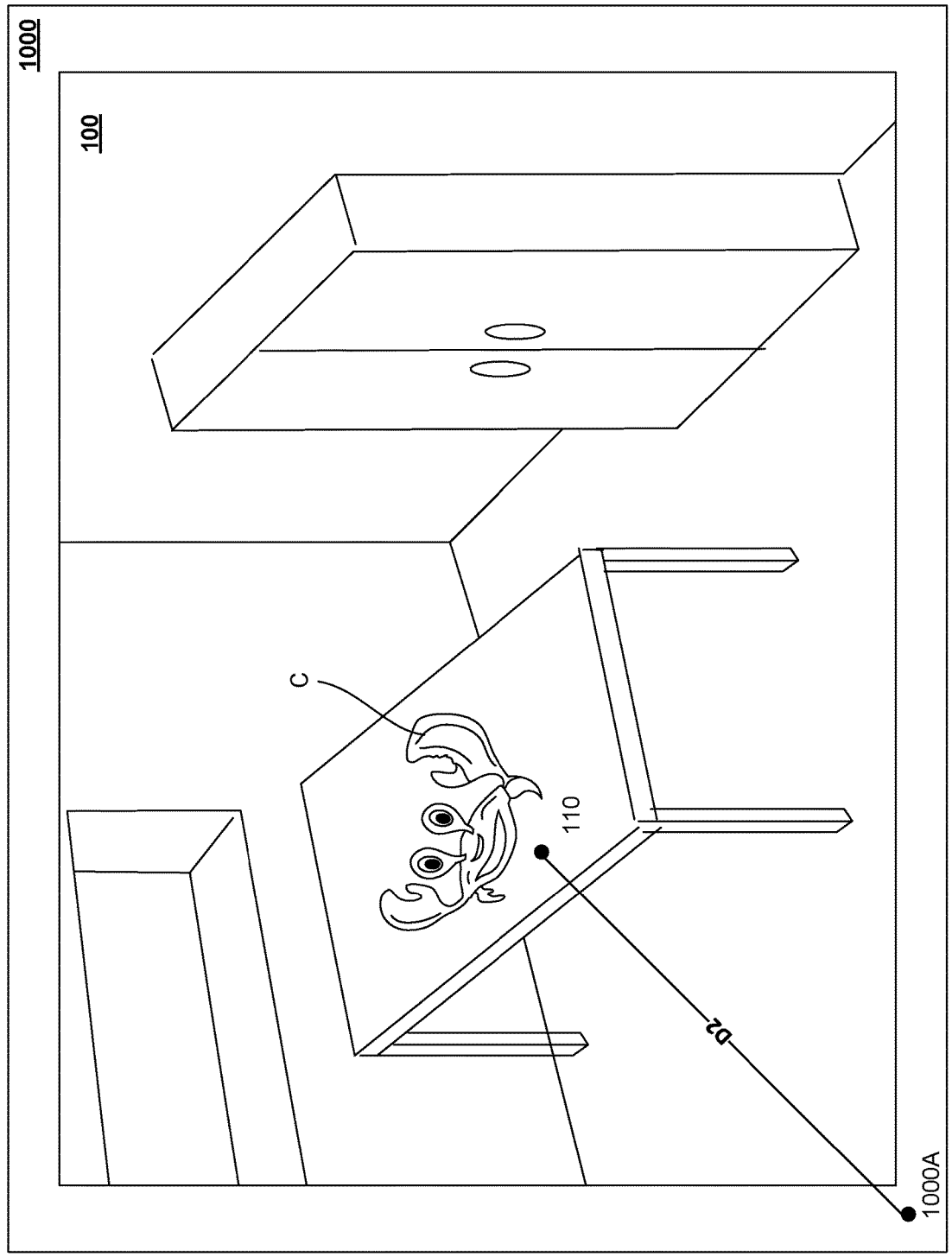
Figure 3D:
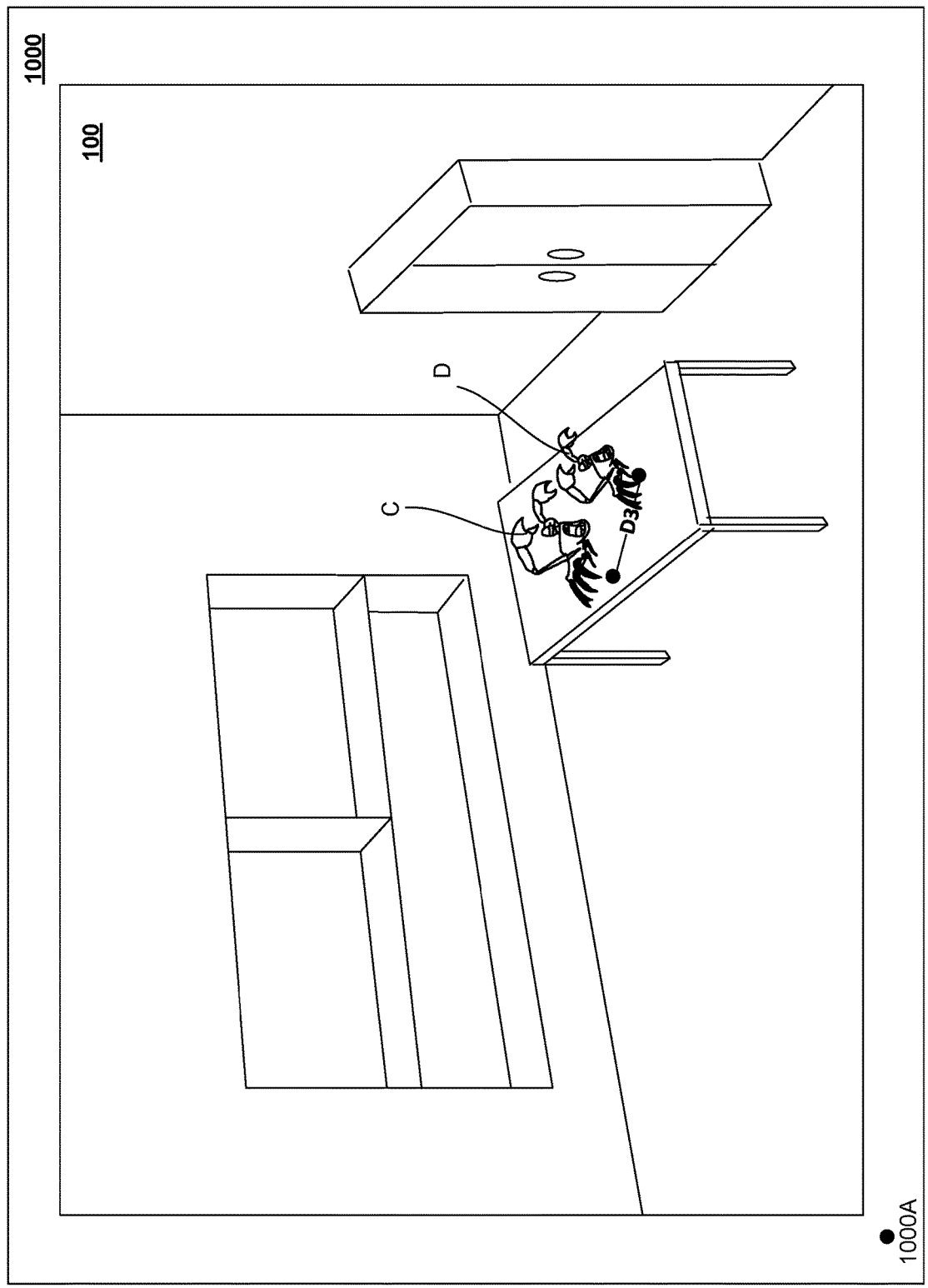

An affected animation, or interactive animation, may be executed by the virtual object when, for example, the system detects the approach of the user and/or another virtual object (i.e., detects the electronic device/camera/user and/or the other virtual object within a set threshold distance of the placement position of the virtual object, as illustrated in the example shown in FIGS. 2D, 2G and 2H). In some implementations, specific, or custom, affective/interactive animations, may be executed by the virtual object(s) in specific circumstances/in response to specific animation triggers. Specific circumstances may include, for example, a situation in which a first virtual object and a second virtual object are in some way related, and in which certain reaction(s) would be expected in the presence of the first and second virtual objects. In the example illustrated in FIG. 3C, the virtual object C animates in response to the detection of the electronic device/camera/user within the set threshold distance D2. In this example, the virtual object C turns to face the electronic device/camera/user, and snaps its claws (as may be expected from a crab in this situation). Similarly, in the example illustrated in FIG. 3D, both the virtual object C and the virtual object D animate in response to the detection of each other within the set threshold placement distance D3. In this example, the animation of the virtual object C and the virtual object D involves a fight, or clawing at each other (as may be expected in this situation).

In some implementations, the set of properties may include behavioral properties such as, for example, logic that triggers specific actions or animations to be performed by the virtual character in response to detected conditions or inputs. The set of behavioral properties may be contextual, in that the actions and/or animations triggered are appropriate and/or expected and/or convincing, taking into consideration the type of virtual object(s) involved, relationships between the virtual object(s) and/or the user, the mixed reality scene, or camera view, in which the virtual object(s) are placed, and the like, as illustrated, for example, in FIGS. 3C and 3D. These contextual behavioral properties or characteristics may further enhance the lifelike nature of the virtual object(s) in the mixed reality scene.

For example, in some implementations, the detection of the electronic device, or camera position (essentially corresponding to the position of the user), within the set threshold distance, or set threshold proximity, of the placement position of the virtual object may trigger a set of scripted behaviors, or scripted animations, causing the virtual object to appear to interact with the user in a contextual, appropriate manner as described above. This may include, for example, looking in the direction of the detected electronic device/camera/user (as described above with respect to FIGS. 2D and 3C), waving, jumping, and other forms of acknowledgement and interaction with the user. Similarly, detected movement of the electronic device/camera position/user position from within the set threshold distance to outside of the set threshold distance may trigger a different set of scripted behaviors or animations of the virtual object.

Likewise, in some implementations, detection of a second virtual object within the set threshold placement distance, or set threshold placement proximity, of the placement position of a first virtual object may trigger a set of scripted behaviors, or scripted animations, causing the first and second virtual objects to appear to interact with each other in a contextual, appropriate manner. This may include, for example, turning to look at each other (as described above with respect to FIG. 2G), moving toward each other/gesturing to each other (as described above with respect to FIG. 2G), the gaze of the second virtual object following the first object as the first object moves, the second virtual object reacting appropriately/contextually to actions of the first virtual object (as described above with respect to FIG. 3D), laughing, fighting, dancing, and other forms of acknowledgment and interaction that would be a convincing and/or expected interaction between the first and second virtual objects. Similarly, detected movement of second virtual object from within the set threshold distance to outside of the set threshold distance may trigger a different set of scripted behaviors or animations of the first virtual object.

As noted above, each of the sequential illustrations of the mixed reality scenes 100, or in some implementations, camera views 100, shown in FIGS. 3A-3D is a still, or static, two-dimensional image, representing a snapshot at a point in a particular animation and/or interaction of the first and second virtual characters C and D. However, it may be understood that the animation, or interaction, displayed by the first and second virtual characters C and D in the mixed reality scene 100 may be a substantially continuous dynamic animation of 3D virtual object(s), or an intermittent dynamic animation of 3D virtual object(s), providing a relatively realistic representation of the movement of the virtual character.

A set of scripted behaviors or animations could be, more simply, randomly executed by the virtual objects in the mixed reality scene, or camera view, of the physical environment, without taking into account camera/user position and/or orientation, and/or virtual object position and/or orientation. However, this approach would not result in as realistic or convincing an effect. Combining these inputs related to the relative position/orientation of the electronic device/camera/user and the virtual object(s) and these sets of properties into a system may cause virtual objects to appear more convincingly present in the mixed reality scene including the physical environment, as the virtual objects interact with users and/or each other, similar to how a real person, a real animal, and other such object would interact in a similar environment, and when confronted with similar circumstances. Reactions, responses, behaviors, interactions and the like triggered in this manner may provide a realistic, convincing mixed reality environment, thus enhancing the user experience.

Another example of the placement of virtual objects in a camera view 310 of a physical environment, and interaction of virtual characters selected from a gallery 330 of virtual characters, is illustrated in FIGS. 4A-4J. In this particular example, an electronic device 300 may include a display 320, and an imaging device 340, or a camera 340. A mixed reality scene 310, or camera view 310, including the physical environment, may be displayed on the display 320 based on images captured by the camera 340. The gallery 330 may include a plurality of virtual objects, or virtual characters, for selection for selection and placement by the user in the mixed reality scene 310, or camera view 310 including the physical environment displayed on the display 320.

Figure 4D:
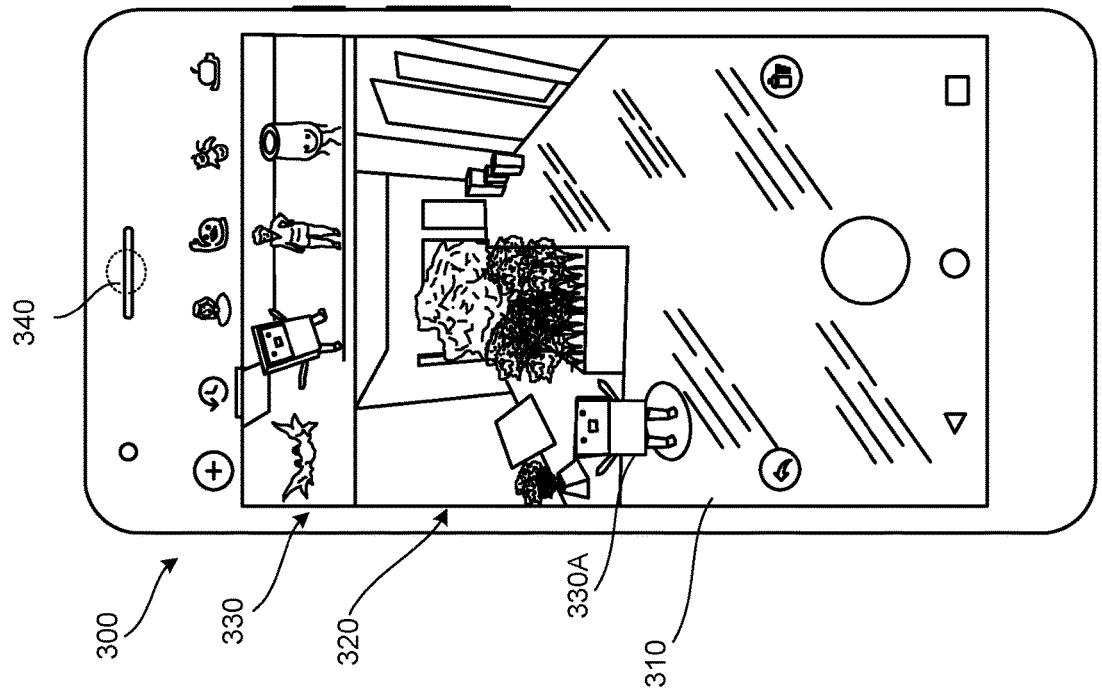
Figure 4C:
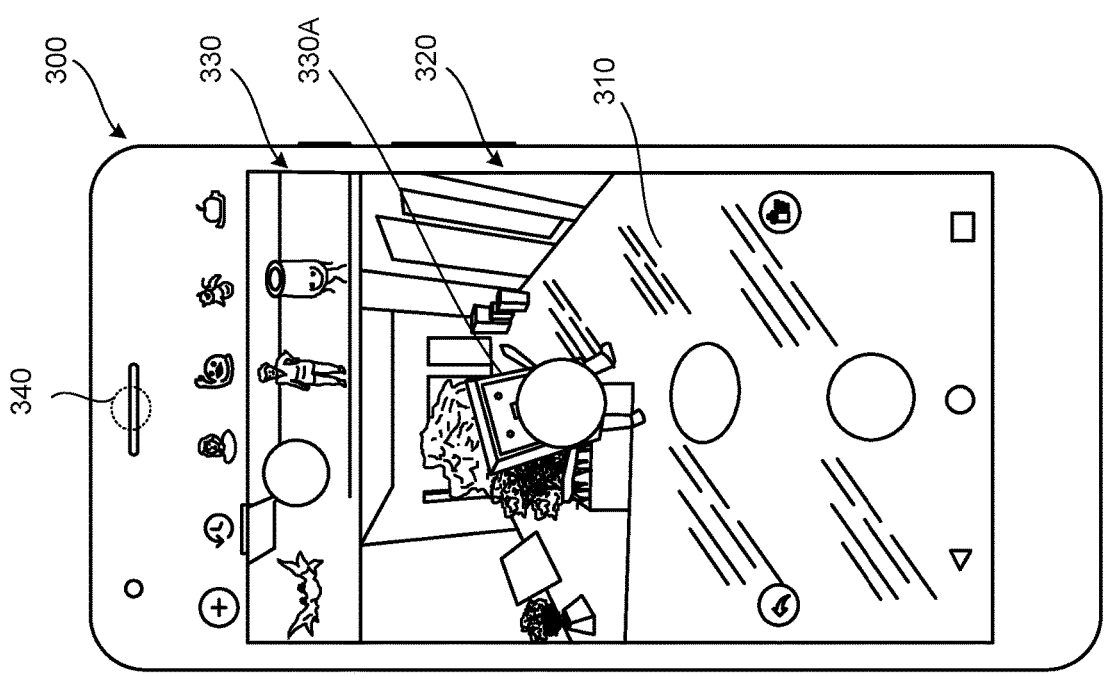

A first virtual character 330A may be selected by the user, as shown in FIG. 4B, and placed at a first placement position 310A in the mixed reality scene 310, or camera view 310, as shown in FIGS. 4C and 4D. A second virtual character 330B may then be selected by the user, as shown in FIG. 4E, for placement at a second placement position 310B in the mixed reality scene 310, or camera view 310, as shown in FIG. 4F. The placement of the second virtual character 310B within a threshold placement distance of the first virtual character 310A may be detected and interpreted by the system as an animation trigger. That is, as shown in FIG. 4F, the first virtual character 330A may react to the placement of the second virtual character 330B by, for example, turning toward the second virtual character 330B, smiling, and the like. Thus, the detected animation trigger may cause identification of animation(s) for at least one of the first virtual character 310A or the second virtual character 310B. Additional virtual characters may be added to the mixed reality scene 310, or camera view 310, in a similar manner as described above. Likewise, virtual characters may be removed from the mixed reality scene 310, or camera view 310, in a similar manner.

One, or both, of the first virtual character 330A and/or the second virtual character 330B may animate in response to detection of a placement distance between the first and second virtual characters 330A and 330B that is less than a threshold placement distance D3 (i.e., in response to the detection of this animation trigger). The system may select, or identify, the type of animation, from a plurality of animations, to be executed by the first and/or second virtual characters 310A and 310B based on, for example, the scripted behaviors, triggering conditions, and the like described above. In some implementations, the distance between the first and second virtual characters 330A and 330B may be less than or equal to the set threshold placement distance at initial placement in the camera view 310 of the physical environment. In some implementations, the user may move one, or both, of the first virtual character 330A and/or the second virtual character 330B to move the first and second virtual characters to within the set threshold distance D3 to cause one of the first virtual character 330A or the second virtual character 330B to animate.

In the example shown in FIGS. 4G-4J, in response to detection of the first and second virtual characters 330A and 330B at a distance that is less than or equal to the set threshold placement distance D3 (for example, a first animation trigger), the second virtual character 330B animates. In this example, the animation of the second virtual character 330B includes dancing. In response to the animation (dancing) of the second virtual character 330B (for example, a second animation trigger), the first virtual character 330A reacts with a contextual animation, in the form of clapping in this example. In some implementations, an orientation and/or a size, or scale, of the virtual characters in the camera view 310 may be adjusted. In some implementations, the adjustment in orientation and/or size/scale may be incorporated into the animation of the virtual character(s). In some implementations, the adjustment in orientation and/or size/scale may be implemented by a user input. FIG. 4H illustrates an example in which an orientation of the second virtual character 330B is adjusted. FIGS. 4H and 4I illustrate an example in which a size, or scale, of the second virtual character 330B is adjusted.

As noted above, each of the sequential illustrations of the mixed reality scenes 310, or camera views 310, shown in FIGS. 4A-4J is a still image, representing a snapshot at a point in a particular animation and/or interaction of the first and second virtual characters 330A and 330B. However, it may be understood that the animation, or interaction, displayed by the first and second virtual characters 330A and 330B in the mixed reality scene 310, or camera view 310, may be a substantially continuous dynamic animation of 3D virtual object(s), or an intermittent dynamic animation of 3D virtual object(s), providing a relatively realistic representation of the movement of the virtual character.

Figure 5:
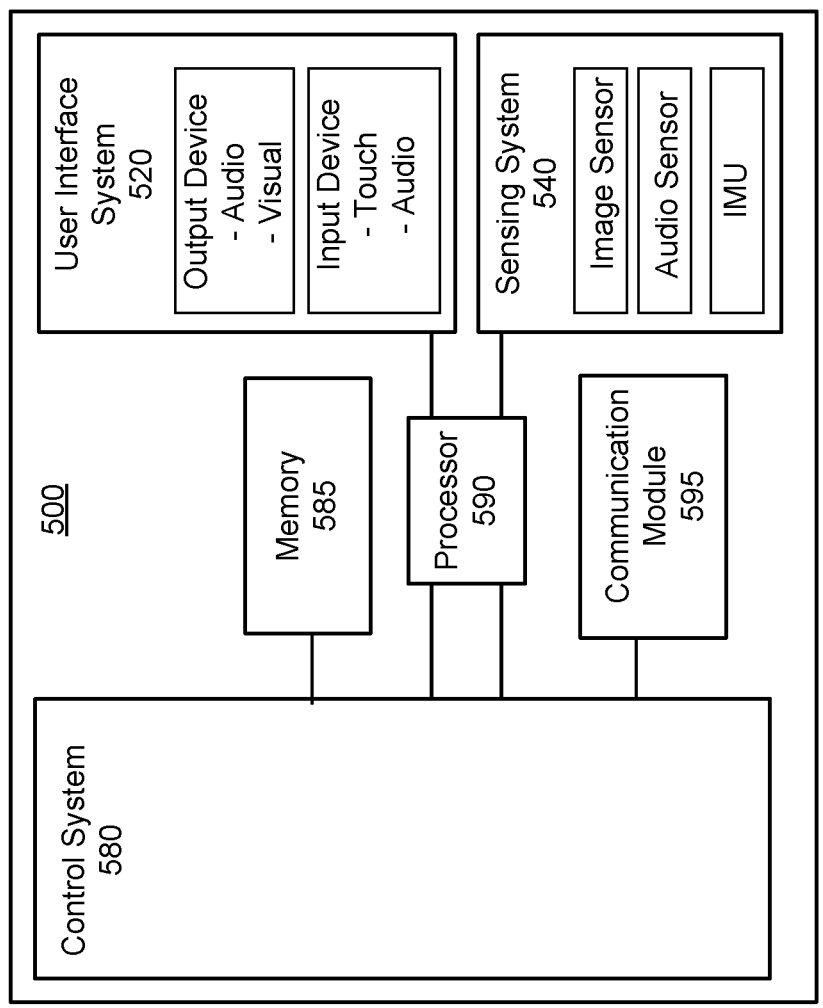
FIG. 5 is a block diagram of an exemplary system for generating an augmented reality, or mixed reality, environment.

FIG. 5 is block diagram of an electronic device 500 that can generate an augmented reality, or mixed reality environment, and provide for interaction of virtual characters, in accordance with implementations described herein. As shown in FIG. 5, the electronic device may include a user interface system 520 including an output device and an input device. The output device may include, for example, a display for visual output, a speaker for audio output, and the like. The input device may include, for example, a touch input device that can receive tactile user inputs, a microphone that can receive audible user inputs, and the like. The electronic device 500 may also include a sensing system 540. The sensing system 540 may include, for example, a light sensor, an audio sensor, an image sensor/imaging device, or camera, a distance/proximity sensor, a positional sensor, and/or other sensors and/or different combination(s) of sensors. Some of the sensors included in the sensing system 540 may provide for positional detection and tracking of the electronic device 500. Some of the sensors of the sensing system 540 may provide for the capture of images of the physical environment for display on a component of the user interface system 520. The electronic device 500 may also include a control system 580. The control system 580 may include, for example, a power control device, audio and video control devices, an optical control device, and/or other such devices and/or different combination(s) of devices. The user interface system 520, and/or the sensing system 540 and/or the control system 580 may include more, or fewer, devices, depending on a particular implementation, and may have a different physical arrangement that shown. The electronic device 500 may also include a processor 590 in communication with the user interface system 520, the sensing system 540 and the control system 580, a memory 585, and a communication module 595. The communication module 595 may provide for communication between the electronic device 500 and other, external devices.

Figure 6:
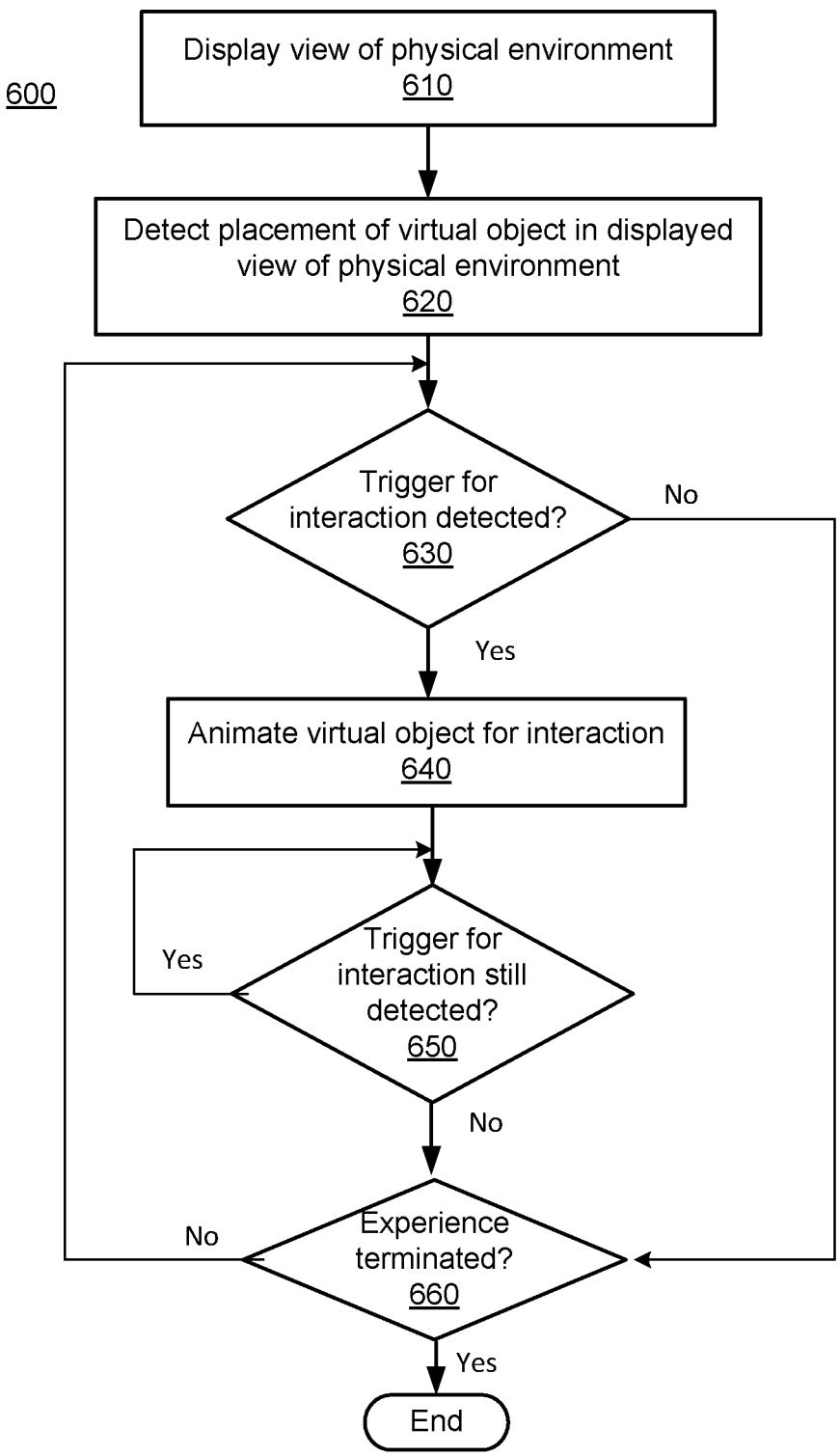
FIG. 6 is a flowchart of a method of providing for interaction of virtual objects in an augmented reality, or mixed reality, environment, in accordance with implementations described herein

A method 600 of providing for interaction of virtual objects in an augmented, or mixed reality environment, in accordance with implementations described herein, is shown in FIG. 6. A user may initiate an augmented reality, or mixed reality, or virtual reality experience, using, for example, an electronic device to display a mixed reality scene including a view of a physical environment (block 610). The mixed reality scene including the view of the physical environment may be, for example, a camera view of the physical environment captured by an imaging device of the electronic device, and displayed on a display device of the electronic device. One or more virtual objects may be placed in the mixed reality scene including the physical environment (block 620). The one or more virtual objects may be placed in the mixed reality scene, or camera view, including the physical environment based on a selection made by the user, and displayed on the display device of the electronic device, superimposed on the mixed reality scene, or camera view.

In response to the detection of a trigger for interaction (block 630), the virtual object displayed in the mixed reality scene, or camera view may be animated for interaction, based on the type of trigger detected (block 640). In some implementations, detection of the electronic device within a set threshold distance, or proximity, of a placement position of the virtual object may trigger an animation for interaction with the user. In some implementations, detection of a new virtual object within a set threshold distance, or proximity, of a placement position of the existing virtual object may trigger an animation for interaction between the new virtual object and the existing virtual object. In some implementations, characteristics associated with the new virtual object may trigger a particular animation for a specific type of interaction between the new virtual object and the existing virtual object. In some implementations, conditions in the environment in which the virtual object is placed may trigger an animation of the virtual object. In some implementations, the animation of the virtual object may be implemented in accordance with a set of rules. The process may continue until it is determined that the trigger for interaction is no longer detected (block 650) and/or the augmented reality/mixed reality experience has been terminated (block 660).

Figure 7:
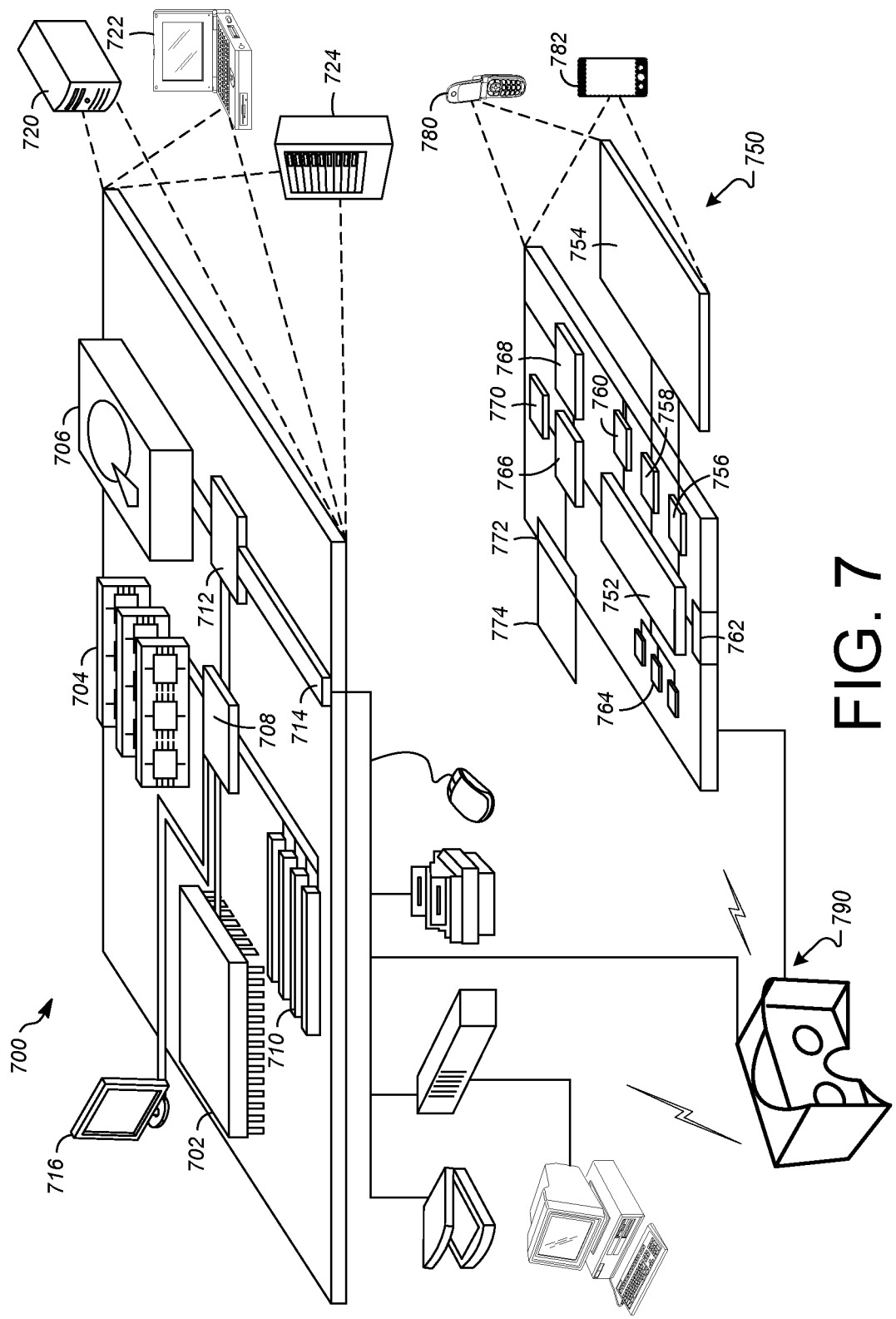
FIG. 7 shows an example of a computer device and a mobile computer device that can be used to implement the techniques described herein.

FIG. 7 shows an example of a computer device 700 and a mobile computer device 750, which may be used with the techniques described here. Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, Wi-Fi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 7 can include sensors that interface with a virtual reality (VR headset/HMD device 790). For example, one or more sensors included on a computing device 750 or other computing device depicted in FIG. 7, can provide input to VR headset 790 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 750 can use the sensors to determine an absolute position and/or a detected rotation of the computing device in the VR space that can then be used as input to the VR space. For example, the computing device 750 may be incorporated into the VR space as a virtual object, such as a controller, a laser pointer, a keyboard, a weapon, etc. Positioning of the computing device/virtual object by the user when incorporated into the VR space can allow the user to position the computing device so as to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 750 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 750 when the computing device is incorporated into the VR space can cause a particular action to occur in the VR space.

In some implementations, a touchscreen of the computing device 750 can be rendered as a touchpad in VR space. A user can interact with the touchscreen of the computing device 750. The interactions are rendered, in VR headset 790 for example, as movements on the rendered touchpad in the VR space. The rendered movements can control virtual objects in the VR space.

In some implementations, one or more output devices included on the computing device 750 can provide output and/or feedback to a user of the VR headset 790 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 750 may appear as another object in a computer-generated, 3D environment. Interactions by the user with the computing device 750 (e.g., rotating, shaking, touching a touchscreen, swiping a finger across a touch screen) can be interpreted as interactions with the object in the VR space. In the example of the laser pointer in a VR space, the computing device 750 appears as a virtual laser pointer in the computer-generated, 3D environment. As the user manipulates the computing device 750, the user in the VR space sees movement of the laser pointer. The user receives feedback from interactions with the computing device 750 in the VR environment on the computing device 750 or on the VR headset 790.

In some implementations, a computing device 750 may include a touchscreen. For example, a user can interact with the touchscreen in a particular manner that can mimic what happens on the touchscreen with what happens in the VR space. For example, a user may use a pinching-type motion to zoom content displayed on the touchscreen. This pinching-type motion on the touchscreen can cause information provided in the VR space to be zoomed. In another example, the computing device may be rendered as a virtual book in a computer-generated, 3D environment. In the VR space, the pages of the book can be displayed in the VR space and the swiping of a finger of the user across the touchscreen can be interpreted as turning/flipping a page of the virtual book. As each page is turned/flipped, in addition to seeing the page contents change, the user may be provided with audio feedback, such as the sound of the turning of a page in a book.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

Computing device 700 is intended to represent various forms of digital computers and devices, including, but not limited to laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A computer-implemented method, comprising:
    displaying, by an electronic device, a mixed reality scene;
    detecting a selection of a first virtual object for placement in the mixed reality scene;
    displaying the selected first virtual object at a placement position in the mixed reality scene in response to the detected selection;
    detecting an animation trigger, of a plurality of animation triggers, including:
        detecting placement of a second virtual object at a placement distance from the placement position of the first virtual object that is less than or equal to a threshold placement distance;
        detecting a first position in the physical environment corresponding to the placement position of the first virtual object in the mixed reality scene;
        detecting a second position in the physical environment corresponding to the placement position of the second virtual object in the mixed reality scene; and
        detecting the animation trigger in response to a detection of a distance between the first position and the second position that is less than or equal to the threshold placement distance;
    identifying an animation, from a plurality of animations, for at least one of the first virtual object or the second virtual object based on the detected animation trigger; and
    executing the identified animation in response to the detected animation trigger.

2. The computer-implemented method of claim 1, wherein identifying the animation, and executing the identified animation includes:
    identifying an interactive animation in response to the determination that the detected distance is less than or equal to the threshold distance; and
    executing the interactive animation, causing the at least one of the first virtual object or the second virtual object to execute a contextual interaction in response to the determination that the detected distance is less than or equal to the threshold distance.

3. The computer-implemented method of claim 1, wherein detecting the animation trigger, identifying the animation, and executing the selected animation includes:
    identifying an affected animation in response to the animation trigger; and
    executing the affected animation, causing at least one of the first virtual object or the second virtual object to execute a contextual interaction with the other of the first virtual object or the second virtual object, in response to detection of the first virtual object and the second virtual object within the threshold placement distance of each other.

4. The computer-implemented method of claim 3, wherein executing the affected animation includes:
executing the affected animation of at least one of the first virtual object or the second virtual object, the affected animation including a plurality of contextual behavioral properties, the plurality of contextual behavioral properties being associated with a relationship between the first virtual object and the second virtual object, and with an environment associated with the mixed reality scene.

5. The computer-implemented method of claim 1, wherein detecting the distance between the first position of the first virtual object and the position of the second virtual object includes:
detecting a three-dimensional coordinate position of the first virtual object in the physical environment corresponding to the placement position of the first virtual object in the mixed reality scene;
detecting a three-dimensional coordinate position of the second virtual object in the physical environment corresponding to the placement position of the second virtual object in the mixed reality scene; and
detecting the distance between the first virtual object and the second virtual object based on the detected three-dimensional coordinate position of the first virtual object and the detected three-dimensional coordinate position of the second virtual object.

6. The computer-implemented method of claim 1, wherein detecting the animation trigger, identifying the animation from the plurality of animations, and executing the identified animation, includes:
identifying an idle animation in response to the display of the first virtual object in the mixed reality scene; and
executing the idle animation of the first virtual object, the idle animation of the first virtual object corresponding to an idle behavior characteristic associated with the first virtual object.

7. The computer-implemented method of claim 1, wherein displaying a mixed reality scene includes:
capturing, by an imaging device of the electronic device, an image of a physical environment;
displaying, on a display device of the electronic device, the image of the physical environment captured by the imaging device; and
displaying, on the display device, the selected first virtual object, superimposed on the image of the physical environment, at a placement position in the mixed reality scene corresponding to a physical position in the physical environment.

8. A system, comprising:
a computing device configured to generate a mixed reality environment, the computing device including:
a memory storing executable instructions; and
a processor configured to execute the instructions to cause the computing device to:
display a mixed reality scene;
detect placement of a first virtual object at a first placement position in the mixed reality scene;
detect placement of a second virtual object at a second placement position in the mixed reality scene;
detect an animation trigger, of a plurality of animation triggers, including:
detect a three-dimensional coordinate position of the first virtual object in the physical environment corresponding to the placement position of the first virtual object in the mixed reality scene;
detect a three-dimensional coordinate position of the second virtual object in the physical environment corresponding to the placement position of the second virtual object in the mixed reality scene;
detect a distance between the first virtual object and the second virtual object based on the detected three-dimensional coordinate position of the first virtual object and the detected three-dimensional coordinate position of the second virtual object; and
detect the animation trigger in response to a determination that the distance between the first virtual object and the second virtual object is less than or equal to a threshold placement distance;
identify an animation, from a plurality of animations, for the first virtual object based on the detected animation trigger; and
execute the identified animation of the first virtual object in response to the detected animation trigger.

9. The system of claim 8, wherein the processor is further configured to execute the instructions to cause the computing device to:
identify an interactive animation in response to the determination that the detected distance is less than or equal to the threshold distance; and
execute the interactive animation, causing at least one of the first virtual object or the second virtual object to execute a contextual interaction in response to the determination that the detected distance is less than or equal to threshold distance.

10. The system of claim 8, wherein, in identifying the animation, the processor is further configured to execute the instructions to cause the computing device to:
identify an affected animation, from the plurality of animations, in response to the detected placement of the second virtual object; and
execute the affected animation, causing at least one of the first virtual object or the second virtual object to execute a contextual interaction with the other of the first virtual object or the second virtual object, in response to detection of the first virtual object and the second virtual object within the threshold placement distance of each other.

11. The system of claim 10, wherein the affected animation includes a plurality of contextual behavioral properties, the plurality of contextual behavioral properties being associated with a relationship between the first virtual object and the second virtual object, and with an environment associated with the mixed reality scene.

12. The system of claim 8, wherein the processor is further configured to execute the instructions to cause the computing device to:
activate an imaging device of the computing device, and capture an image of a physical environment;
display, on a display device of the computing device, the image of the physical environment captured by the imaging device; and display, on the display device, the identified first virtual object, superimposed on the image of the physical environment, at a placement position in the mixed reality scene corresponding to a physical position in the physical environment.

* * * * *